US012659800B2

(12) United States Patent
Elazzouni et al.

(10) Patent No.: US 12,659,800 B2
(45) Date of Patent: Jun. 16, 2026

(54) TRAFFIC-BASED DATA COMPRESSION

(71) Applicant: QUALCOMM Incorporated, San Diego, CA (US)

(72) Inventors: Sherif Elazzouni, San Diego, CA (US); Gavin Bernard Horn, La Jolla, CA (US); Sitaramanjaneyulu Kanamarlapudi, San Diego, CA (US); Ozcan Ozturk, San Diego, CA (US)

( * ) Notice: Subject to any disclaimer, the term of this patent is extended or adjusted under 35 U.S.C. 154(b) by 12 days.

(21) Appl. No.: 18/776,865

(22) Filed: Jul. 18, 2024

(65) Prior Publication Data

US 2026/0025706 A1      Jan. 22, 2026

(51) Int. Cl.
H04W 28/06      (2009.01)
H04L 41/16      (2022.01)
H04W 72/21      (2023.01)

(52) U.S. Cl.
CPC ............. H04W 28/06 (2013.01); H04L 41/16 (2013.01); H04W 72/21 (2023.01)

(58) Field of Classification Search
CPC ........ H04W 28/06; H04W 72/21; H04L 41/16
See application file for complete search history.

(56) References Cited

U.S. PATENT DOCUMENTS 11,564,125 B2    1/2023  Dalmiya et al.
2019/0215725 A1*  7/2019  Kim ...................... H04W 12/03

2021/0037416 A1*  2/2021  Quan .................. H04W 84/042
2022/0201555 A1*  6/2022  Zeng ..................... H04W 28/20
2022/0279381 A1    9/2022  Yao et al.
2022/0321566 A1*  10/2022  Coyle .................. H04L 63/101

FOREIGN PATENT DOCUMENTS

WO        2023005452 A1     2/2023

OTHER PUBLICATIONS

International Search Report and Written Opinion—PCT/US2025/032996—ISA/EPO—Aug. 21, 2025.

* cited by examiner

*Primary Examiner* — Azizul Choudhury

(57)        ABSTRACT

Various aspects of the present disclosure generally relate to wireless communication. In some aspects, a first wireless communication device may receive configuration information associated with uplink data compression, the uplink data compression being associated with at least one of multiple compression dictionaries or multiple compression buffers. The first wireless communication device may compress, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data. The first wireless communication device may transmit an uplink communication that includes the compressed uplink data. Numerous other aspects are described.

20 Claims, 13 Drawing Sheets

800
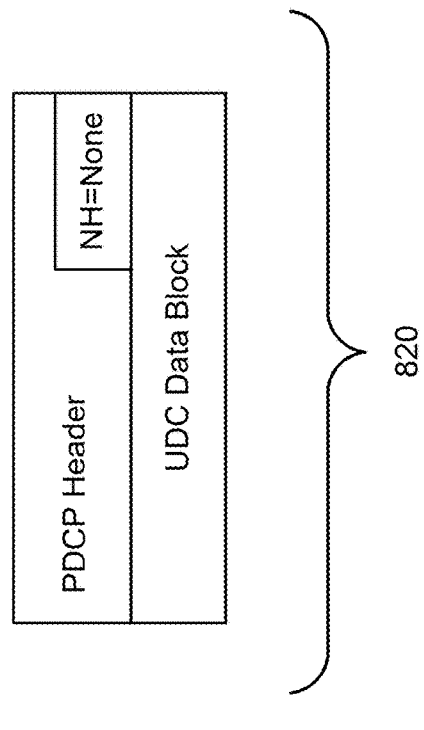
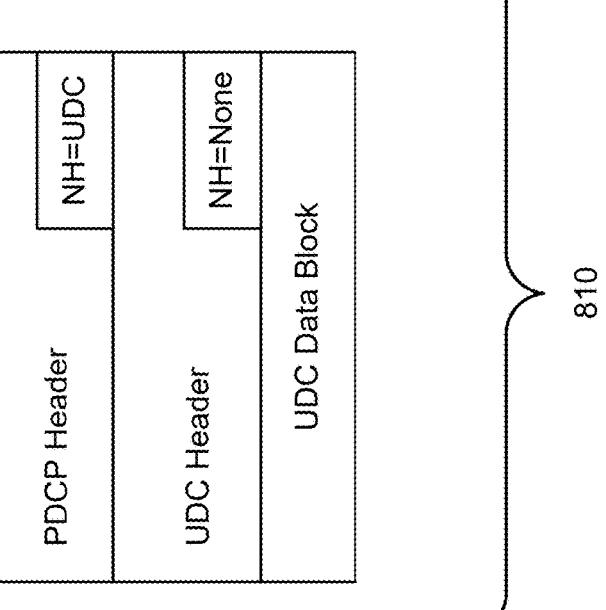
FIG. 8

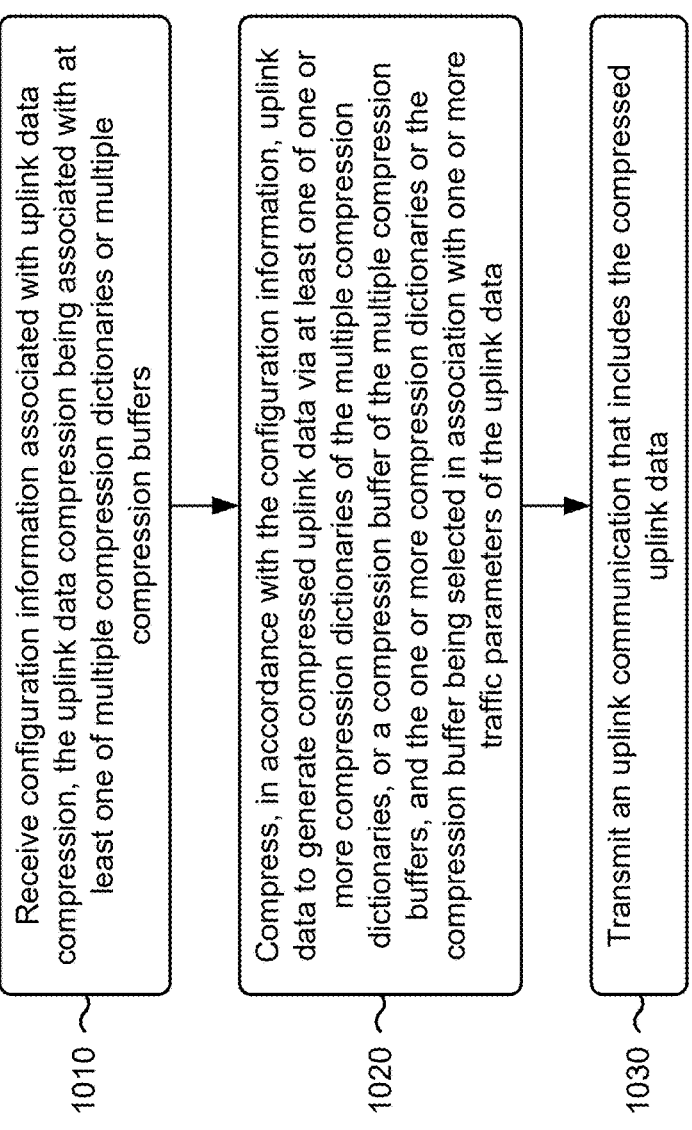

1010 — Receive configuration information associated with uplink data compression, the uplink data compression being associated with at least one of multiple compression dictionaries or multiple compression buffers 1020 — Compress, in accordance with the configuration information, uplink data to generate compressed uplink data via at least one of one or more compression dictionaries of the multiple compression dictionaries, or a compression buffer of the multiple compression buffers, and the one or more compression dictionaries or the compression buffer being selected in association with one or more traffic parameters of the uplink data 1030 — Transmit an uplink communication that includes the compressed uplink data

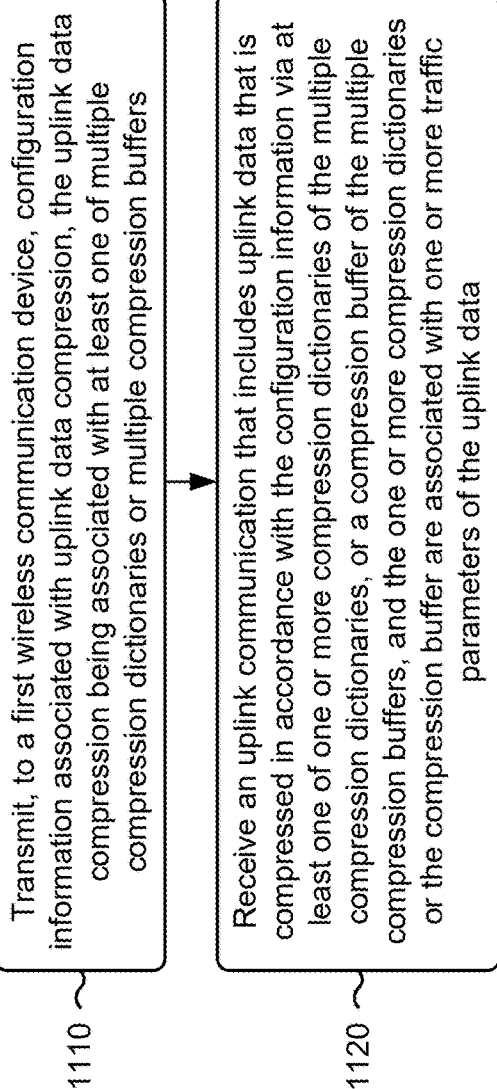

Transmit, to a first wireless communication device, configuration information associated with uplink data compression, the uplink data compression being associated with at least one of multiple compression dictionaries or multiple compression buffers Receive an uplink communication that includes uplink data that is compressed in accordance with the configuration information via at least one of one or more compression dictionaries of the multiple compression dictionaries, or a compression buffer of the multiple compression buffers, and the one or more compression dictionaries or the compression buffer are associated with one or more traffic parameters of the uplink data

TRAFFIC-BASED DATA COMPRESSION

FIELD OF THE DISCLOSURE

Aspects of the present disclosure generally relate to wireless communication and specifically relate to techniques, apparatuses, and methods for traffic-based data compression.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to an apparatus for wireless communication at a first wireless communication device. The apparatus may include one or more memories and one or more processors coupled to the one or more memories. The one or more processors may be configured to receive configuration information associated with uplink data compression, the uplink data compression being associated with at least one of multiple compression dictionaries or multiple compression buffers. The one or more processors may be configured to compress, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data. The one or more processors may be configured to transmit an uplink communication that includes the compressed uplink data.

Some aspects described herein relate to an apparatus for wireless communication at a second wireless communication device. The apparatus may include one or more memories and one or more processors coupled to the one or more memories. The one or more processors may be configured to transmit, to a first wireless communication device, configuration information associated with uplink data compression, the uplink data compression being associated with at least one of multiple compression dictionaries or multiple compression buffers. The one or more processors may be configured to receive an uplink communication that includes uplink data that is compressed in accordance with the configuration information via at least one of: one or more compression dictionaries of the multiple compression dictionaries, or a compression buffer of the multiple compression buffers, and the one or more compression dictionaries or the compression buffer are associated with one or more traffic parameters of the uplink data.

Some aspects described herein relate to a method of wireless communication performed by a first wireless communication device. The method may include receiving configuration information associated with uplink data compression, the uplink data compression being associated with at least one of multiple compression dictionaries or multiple compression buffers. The method may include compressing, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data. The method may include transmitting an uplink communication that includes the compressed uplink data.

Some aspects described herein relate to a method of wireless communication performed by a second wireless communication device. The method may include transmitting, to a first wireless communication device, configuration information associated with uplink data compression, the uplink data compression being associated with at least one of multiple compression dictionaries or multiple compression buffers. The method may include receiving an uplink communication that includes uplink data that is compressed in accordance with the configuration information via at least one of: one or more compression dictionaries of the multiple compression dictionaries, or a compression buffer of the multiple compression buffers, and the one or more compression dictionaries or the compression buffer are associated with one or more traffic parameters of the uplink data.

Some aspects described herein relate to a non-transitory computer-readable medium that stores a set of instructions for wireless communication by a first wireless communication device. The set of instructions, when executed by one or more processors of the first wireless communication device, may cause the first wireless communication device to receive configuration information associated with uplink data compression, the uplink data compression being associated with at least one of multiple compression dictionaries or multiple compression buffers. The set of instructions, when executed by one or more processors of the first wireless communication device, may cause the first wireless communication device to compress, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data. The set of instructions, when executed by one or more processors of the first wireless communication device, may cause the first wireless communication device to transmit an uplink communication that includes the compressed uplink data.

Some aspects described herein relate to a non-transitory computer-readable medium that stores a set of instructions for wireless communication by a second wireless communication device. The set of instructions, when executed by one or more processors of the second wireless communication device, may cause the second wireless communication device to transmit, to a first wireless communication device, configuration information associated with uplink data compression, the uplink data compression being associated with at least one of multiple compression dictionaries or multiple compression buffers. The set of instructions, when executed by one or more processors of the second wireless communication device, may cause the second wireless communication device to receive an uplink communication that includes uplink data that is compressed in accordance with the configuration information via at least one of: one or more compression dictionaries of the multiple compression dictionaries, or a compression buffer of the multiple compression buffers, and the one or more compression dictionaries or the compression buffer are associated with one or more traffic parameters of the uplink data.

Some aspects described herein relate to an apparatus for wireless communication. The apparatus may include means for receiving configuration information associated with uplink data compression, the uplink data compression being associated with at least one of multiple compression dictionaries or multiple compression buffers. The apparatus may include means for compressing, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data. The apparatus may include means for transmitting an uplink communication that includes the compressed uplink data.

Some aspects described herein relate to an apparatus for wireless communication. The apparatus may include means for transmitting, to a first wireless communication device, configuration information associated with uplink data compression, the uplink data compression being associated with at least one of multiple compression dictionaries or multiple compression buffers. The apparatus may include means for receiving an uplink communication that includes uplink data that is compressed in accordance with the configuration information via at least one of: one or more compression dictionaries of the multiple compression dictionaries, or a compression buffer of the multiple compression buffers, and the one or more compression dictionaries or the compression buffer are associated with one or more traffic parameters of the uplink data.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 8 is a diagram illustrating an example associated with removing and/or omitting headers for uncompressed data, in accordance with the present disclosure.

FIG. 10 is a diagram illustrating an example process performed, for example, at a UE or an apparatus of a UE, in accordance with the present disclosure.

FIG. 11 is a diagram illustrating an example process performed, for example, at a network node or an apparatus of a network node, in accordance with the present disclosure.

DETAILED DESCRIPTION

Figure 1:
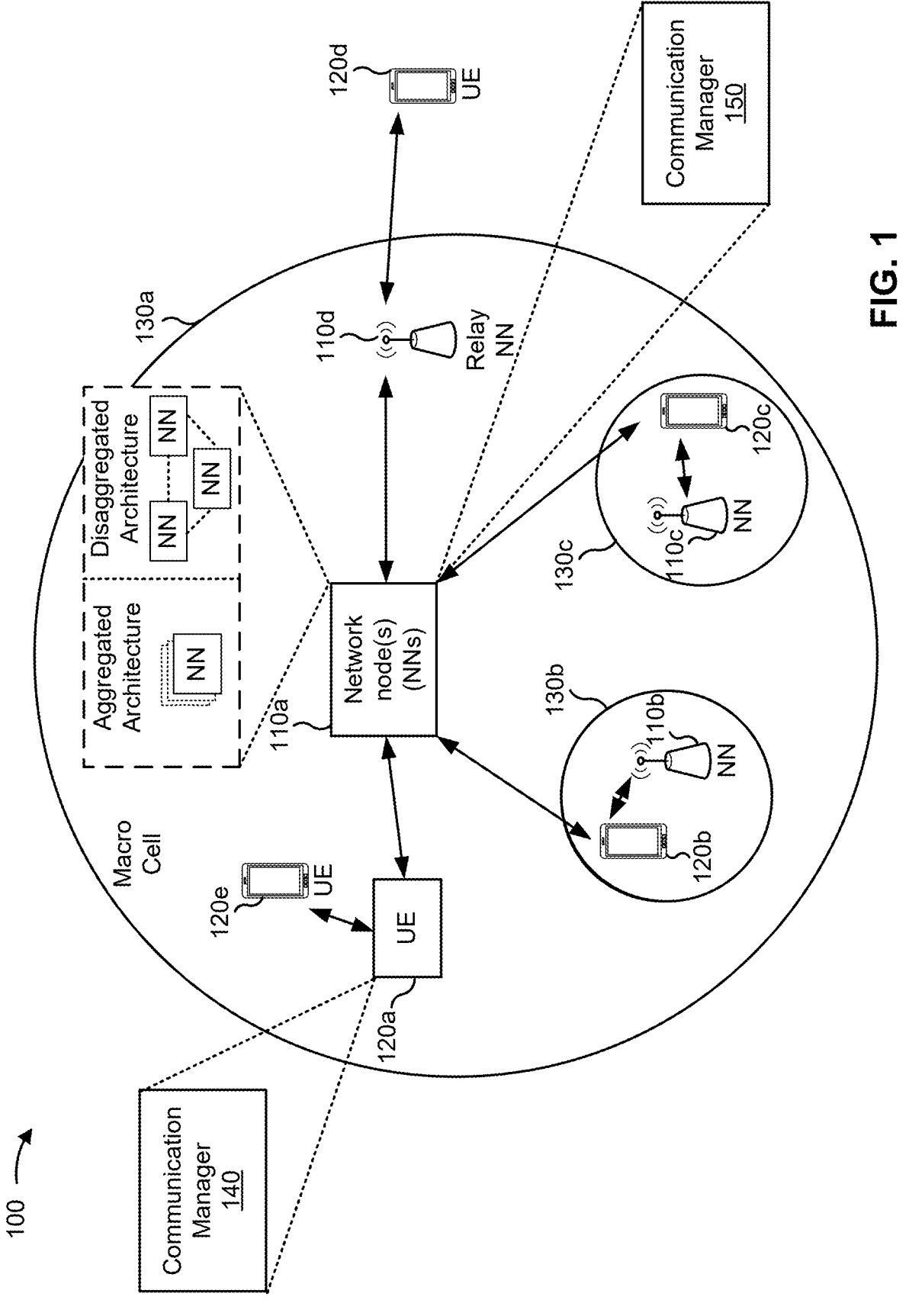
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Some wireless communication systems may support data compression to reduce an amount of data (e.g., quantity of data bits, data volume, data size) to be communicated between wireless communication devices. Data compression may include the compression of data using one or more algorithms known to both (e.g., stored at both or accessible at both) a transmitting (or compressor) wireless communication device and a receiving (or decompressor) wireless communication device. Each algorithm for data compression may be associated with different compression ratios, computational efficiencies, and/or processing speeds. Additionally, each algorithm may be associated with a dictionary that may indicate compression patterns and/or substitutions associated with the use of the algorithm by the transmitting wireless communication device.

In some examples, a first wireless communication device (e.g., compressor device) may obtain one or more data packets (e.g., one or more internet protocol packets, one or more packets including data, such as user data, and/or control information, such as control data, one or more packet data units (PDUs), one or more service data units (SDUs)). The first wireless communication device may route the one or more data packets into a compression buffer. As used herein, "buffer" refers to temporary storage for communicating data packets. "Buffer" may be used interchangeably herein with "data buffer," "reception buffer," "compression buffer," "decompression buffer," and/or "transmission buffer."

In some examples, when routing the one or more data packets to the compression buffer, the first wireless communication device may operate on a "first in, first out basis." For example, the first wireless communication device may obtain a first data packet and then may obtain a second data packet and may route the first data packet into the compression buffer prior to routing the second data packet. In some examples, the first wireless communication device and a second wireless communication device (e.g., decompressor device) may be indicated and/or configured with the algorithm and/or the dictionary used to compress the data. The first wireless communication device may compress at least a portion of each of the one or more data packets. For example, the first wireless communication device may compress one or more headers of a data packet, a data payload of the packet, and/or a control information payload of the packet.

The first wireless communication device may transmit, and the second wireless communication device may receive, one or more compressed data packets along with, or in addition to, an indication of the dictionary used for compression. The second wireless communication device may receive the compressed data and may perform decompression based on the algorithm and/or the dictionary used to compress the data by the first wireless communication device. Some configurations for data compression at a wireless communication device may support a single compression buffer per radio bearer (e.g., a logical channel for transferring user and/or control data packets), where, in some examples, the single compression buffer may have a limited capacity. For example, the single compression buffer may be configured to temporarily store up to N bits and/or bytes, and thus, the single compression buffer may store a limited quantity of data packets on a "first in, first out" basis.

Because the one or more data packets may be routed based on the order in which the one or more data packets are obtained, data packets having the same or similar traffic parameters may be separately processed. For example, the one or more data packets stored by the compression buffer may be associated with different traffic parameters, such as quality of service (QOS) flows, and/or may require different types of processing (e.g., may have different localities), among other examples. For example, a first data packet in the compression buffer may be associated with one or more QoS requirements and/or processing instructions. A second data packet having the same QOS requirement(s) and/or set of processing instructions as the first data packet may be queued outside of the buffer or behind other data packets in the buffer having different QoS requirements and/or processing instructions in accordance with when the data packets were obtained. In some examples, the second data packet may be queued outside of the buffer and/or behind data packets that are to be transmitted without compression (e.g., do not need to be compressed). Thus, the data packets that are to be transmitted uncompressed may occupy buffer space unnecessarily, or prevent data packets that have similar processing parameters from being processed together. Consequently, the transmitting wireless communication device may have to access the same set of QoS flows, processing instructions, and or compression dictionary for two different batches of data packets, which may negatively impact compression efficiency, throughput, and/or spectral efficiency, and may increase latency.

For example, a transmitting wireless device (e.g., compressor device) may obtain a quantity of video data packets along with other data packets such that the video data packets are interspersed with the other data packets based on the order in which they are obtained. The transmitting wireless device may attempt to identify a pattern for more efficient compression in a batch of data packets having multiple different types such as audio, video, voice over internet protocol (VOIP), transmission control packet (TCP) acknowledgements (ACKs), and/or encrypted, among other examples. Different types of data packets may have different patterns while data packets of the same type may share patterns. Thus, the transmitting wireless device may search for more patterns in a batch of data packets having differing types and/or use different dictionaries for different batches, which may negatively impact latency and increase overhead associated with the repeated signaling of a compression dictionary. That is, the first wireless device may receive an indication of an updated dictionary for each new batch of data packets (e.g., as associated with some encoding schemes) in a compression buffer, which may negatively impact overhead.

Various aspects generally relate to techniques for traffic-based data compression using traffic parameters associated with the data (e.g., one or more data packets and/or messages, one or more PDUs) for compression. Some aspects more specifically relate to predicting the traffic parameters associated with the data using an artificial intelligence (AI) and/or a machine learning (ML) (AI/ML) model. Further aspects more specifically relate to selecting a compression dictionary from a set of enabled compression dictionaries and/or one or more compression buffers from a set of enabled compression buffers in accordance with the traffic parameters associated with the data.

For example, a first wireless communication device (e.g., compressor device) may receive an indication of multiple compression dictionaries and/or multiple compression buffers for the compression of data (e.g., sidelink compression, uplink compression, and/or downlink compression). The first wireless communication device may compress the data in accordance with one or more compression dictionaries of the multiple compression dictionaries and/or a compression buffer of the multiple compression buffers. In some aspects, the first wireless device may select the one or more compression dictionaries or the compression buffer based on one or more traffic parameters of the data. In some aspects, the first wireless device may identify the one or more traffic parameters using an AI/ML model that is configured or trained to predict the one or more traffic parameters. The first wireless communication device may transmit the compressed data to a second wireless communication device.

In some aspects, the first wireless communication device may select a number of dictionaries from the multiple compression dictionaries to compress the data. The multiple dictionaries may be provided by a second wireless communication device, indicated by a second wireless communication device, and/or defined by a wireless communication standard, such as the Third Generation Partnership Project (3GPP), and/or configured by an original equipment manufacturer (OEM) configuration of the first wireless communication device and/or the second wireless communication device. In some aspects, the first wireless communication device may classify the data in accordance with the one or more traffic parameters prior to compressing the data. The first wireless communication device may route the data to a compression buffer (e.g., a compression buffer associated with the classification of the data and/or one or more traffic parameters of the data) of the multiple compression buffers based on classifying the data.

Particular aspects of the subject matter described in this disclosure can be implemented to realize one or more of the following potential advantages. For example, different and/or flexible compression behavior by a wireless communication device for more efficient data compression may positively impact throughput, user experience, and/or spectral efficiency and may decrease latency. In some examples, by the first wireless communication device receiving configuration information associated with at least one of multiple compression dictionaries or multiple compression buffers, the described techniques can be used to implement multiple compression buffers and/or compression dictionaries by the first wireless communications device. In some aspects, by the first wireless communication device compressing data via one or more compression dictionaries of the multiple compression dictionaries and/or a compression buffer of the multiple compression buffers that are selected in association with one or more traffic parameters of the data, the described techniques can be used to enable the first wireless communication device to select from the multiple compression buffers and/or compression dictionaries in accordance with different traffic parameters associated with the data. Thus, the first wireless communication device and/or the second wireless communication device may avoid signaling associated with updating the compression dictionary used for each compression operation, thereby conserving communication resources device. Additionally, or alternatively, the first wireless communications device may reduce signaling overhead associated with changing or implementing compression dictionaries for each compression operation, increase a capacity for compressing data by implementing multiple buffers, and increase compression efficiency by selecting a compression dictionary and/or compression buffer in accordance with the traffic parameters of the data, thus increasing throughput.

Further, by the first wireless communication device classifying the data in accordance with the one or more traffic parameters, prior to compressing the data and routing the data to a compression buffer based on classifying the data, the described techniques can be used to allocate data packets having a same type to a same buffer such that the data packets are processed together. Thereby, the first wireless communication device may avoid the segregation of packets having a same type when routed or allocated in accordance with the order in which the packets are obtained. The first wireless communication device may additionally avoid the delay and/or queueing of data packets to be compressed behind data packets that are not to be compressed, among other examples. As a result, the first wireless communication device may increase compression efficiency and reduce processing (e.g., time and/or operations) by reducing the occurrence of data packets having a same type being separately processed, which may decrease latency in association with the reduced processing. By the first wireless communication device communicating an indication of the one or more compression dictionaries or the compression buffer selected in association with one or more traffic parameters of the data, the first wireless device and the second wireless device may increase the likelihood that the compression buffer and a decompression buffer of the second wireless device use the same dictionaries and/or algorithms. In some aspects, by communicating the indication of the one or more compression dictionaries or the compression buffer selected, the second wireless device may preserve integrity of the data and conserve processing resources when decompressing, because the second wireless communication device may use the same or similar information to decompress as the first wireless device used to compress. This may reduce the likelihood of an error in receiving the compressed data.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) user equipment (UE) functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120c.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHz through 24.25 GHZ), FR4a or FR4-1 (52.6 GHz through 71 GHz), FR4 (52.6 GHZ through 114.25 GHZ), and FR5 (114.25 GHz through 300 GHz). Although a portion of FR1 is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (IFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, in accordance with a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move in accordance with the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs).

Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced cMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified in accordance with different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120c) may communicate directly with one another using sidelink communications (for example, without communicating by way of a network node 110 as an intermediary). As an example, the UE 120a may directly transmit data, control information, or other signaling as a sidelink communication to the UE 120c. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive configuration information associated with uplink data compression, the uplink data compression being associated with at least one of multiple compression dictionaries or multiple compression buffers; compress, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data; and transmit an uplink communication that includes the compressed uplink data. Additionally, or alternatively, the communication manager 140 may perform one or more other operations described herein.

In some aspects, the network node 110 may include a communication manager 150. As described in more detail elsewhere herein, the communication manager 150 may transmit, to a first wireless communication device, configuration information associated with uplink data compression, the uplink data compression being associated with at least one of multiple compression dictionaries or multiple compression buffers; and receive an uplink communication that includes uplink data that is compressed in accordance with the configuration information via at least one of: one or more compression dictionaries of the multiple compression dictionaries, or a compression buffer of the multiple compression buffers, and the one or more compression dictionaries or the compression buffer are associated with one or more traffic parameters of the uplink data. Additionally, or alternatively, the communication manager 150 may perform one or more other operations described herein.

As indicated above, FIG. 1 is provided as an example. Other examples may differ from what is described with regard to FIG. 1.

Figure 2:
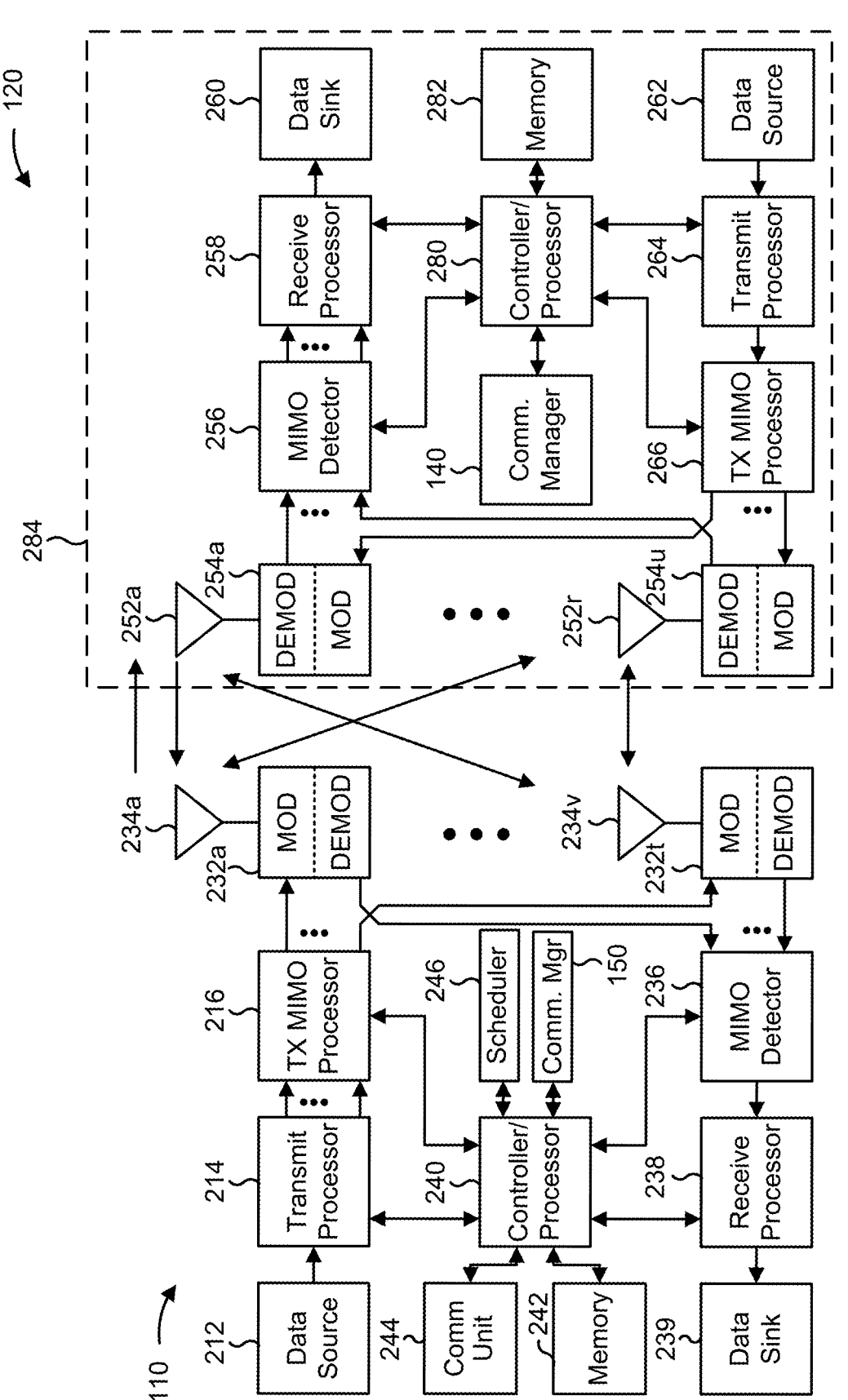
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
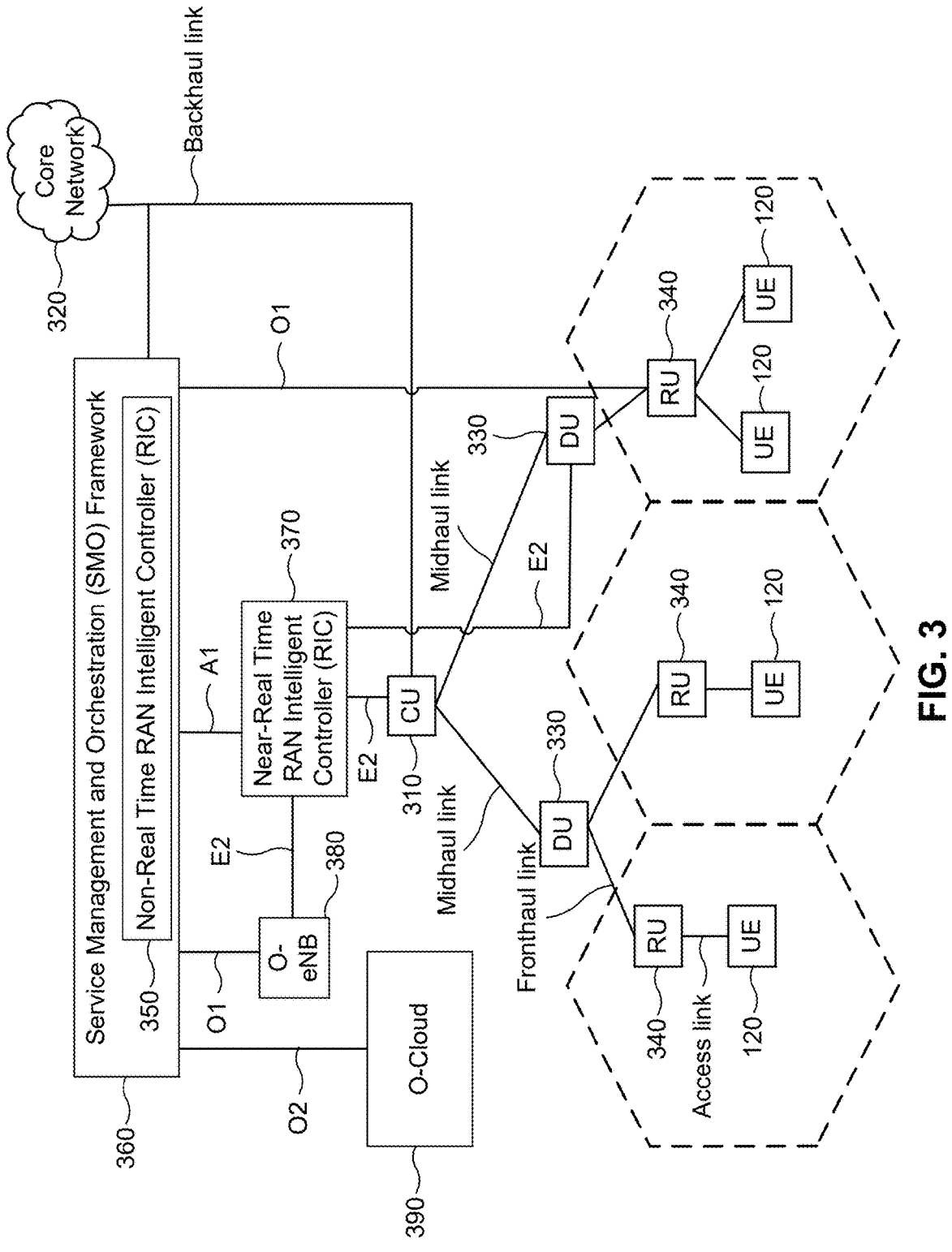
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with traffic-based data compression, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, process 1100 of FIG. 11, or other processes as described herein (alone or in conjunction with one or more other processors). In some aspects, a wireless communication device described herein is the UE 120, is included in the UE 120, or includes one or more components of the UE 120 shown in FIG. 2. In some other aspects, a wireless communication device described herein is the network node 110, is included in the network node 110, or includes one or more components of the network node 110 shown in FIG. 2.

The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, the first wireless communication device includes means for receiving configuration information associated with uplink data compression, the uplink data compression being associated with at least one of multiple compression dictionaries or multiple compression buffers; means for compressing, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data; and/or means for transmitting an uplink communication that includes the compressed uplink data. In some aspects, the means for the first wireless communication device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some aspects, the means for the first wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the second wireless communication device includes means for transmitting, to a first wireless communication device, configuration information associated with uplink data compression, the uplink data compression being associated with at least one of multiple compression dictionaries or multiple compression buffers; and/or means for receiving an uplink communication that includes uplink data that is compressed in accordance with the configuration information via at least one of: one or more compression dictionaries of the multiple compression dictionaries, or a compression buffer of the multiple compression buffers, and the one or more compression dictionaries or the compression buffer are associated with one or more traffic parameters of the uplink data. In some aspects, the means for the second wireless communication device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some aspects, the means for the second wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

As indicated above, FIG. 3 is provided as an example. Other examples may differ from what is described with regard to FIG. 3.

Figure 4:
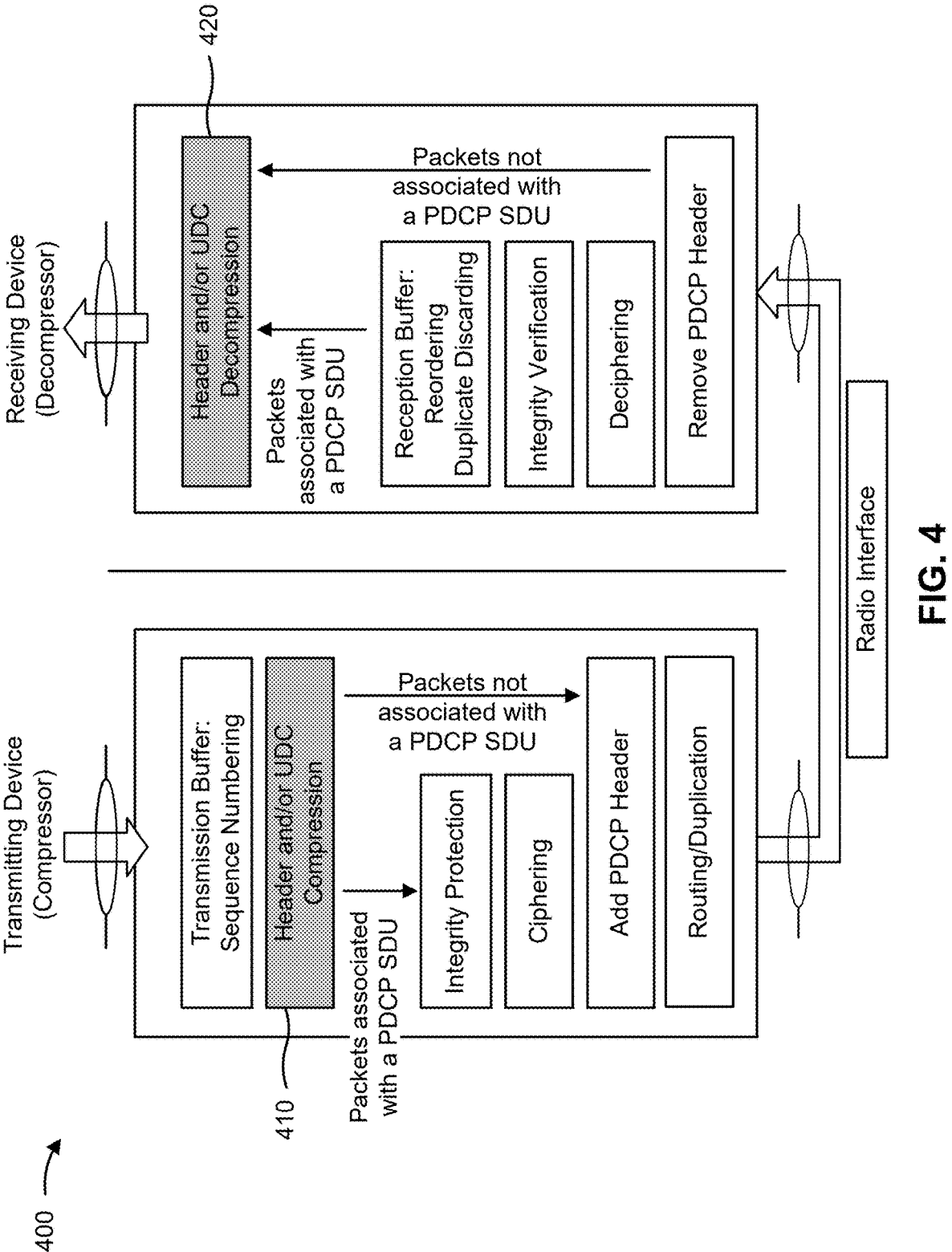
FIG. 4 is a diagram illustrating an example of a compression architecture, in accordance with the present disclosure.

FIG. 4 is a diagram illustrating an example 400 of a compression architecture, in accordance with the present disclosure.

As shown in FIG. 4, the compression architecture includes a transmitting (or compressor) device and a receiving (or decompressor) device. In some cases, the compressor device may be a network node and the decompressor device may be a UE when compression is implemented on a downlink. In some cases, the compressor device may be a UE and the decompressor device may be a network node when compression is implemented on an uplink. In some cases, the compressor device may be a UE and the decompressor device may be another UE when compression is implemented on a sidelink. In some cases, the compressor device may be a network node and the decompressor device may be another network node when compression is implemented on a backhaul.

As shown in FIG. 4, and by reference number 410, the compressor device may perform compression for a packet to be transmitted to the decompressor device. For example, as shown, the compressor device may obtain a data block to be transmitted from transmission buffer and add a sequence number to the data block to form an Ethernet packet, an Internet protocol (IP) packet, transmission control protocol (TCP) packet, a user datagram protocol (UDP) packet, a real-time transport protocol (RTP) packet or another type of packet to be transmitted.

The compressor device may then perform compression to reduce the size of the packet. In some aspects, the compressor device may perform header compression to remove the header (e.g., an Ethernet header, an IP header, a TCP header, a UDP header, an RTP header, or another type of header) from the packet and attach a compression sub-header that includes a context identifier. In some aspects, the compressor may perform uplink data compression (UDC) or another type of data compression to reduce the size of the packet. The compressor device may perform the compression based at least in part on a compression protocol or compression technique, such as robust header compression (RoHC), Ethernet header compression (EHC), and/or UDC.

In some cases, if the packet is associated with a PDCP service data unit (SDU), the packet may be subject to integrity protection and/or ciphering. After applying the integrity protection and/or ciphering, and/or if the packet is not associated with a PDCP SDU, the compressor device may add a PDCP header to form a PDU. The compressor device may then transmit the PDU with the compressed header to the decompressor device via a radio interface (e.g., a Uu interface, a PC5 interface, and/or another type of interface).

As further shown in FIG. 4, the decompressor device may receive the PDU from the compressor device via the radio interface and remove the PDCP header from the PDU. In cases where the packet is associated with a PDCP SDU, the decompressor device may perform deciphering and integrity verification on the packet, and the packet may be stored in a reception buffer where incoming packets may be reordered (e.g., based on sequence number) and/or where duplicate packets may be discarded if the packet is successfully deciphered and passes integrity verification. As shown by reference number 420, the decompressor device may perform header decompression for the packets in the reception buffer and/or for packets that are not associated with a PDCP SDU. For example, the decompressor device may obtain a context identifier (e.g., an RoHC context identifier or another type of context identifier) from the packet and match the context identifier to information contained in a full header associated with a previous packet.

Some configurations for data compression by a compressor device may support a single transmission buffer per radio bearer (e.g., a logical channel for transferring user and/or control data packets) of the compressor device. In such examples, the single transmission buffer may store data packets in the order in which they are obtained and may also output the data packets in the same order (e.g., first in, first out). The single transmission buffer may have a limited capacity.

Because the one or more data packets may be routed in accordance with the order in which they are obtained, data packets having the same or similar traffic parameters may be separately processed. For example, the one or more data packets in the transmission buffer may be associated with varying traffic parameters such as QoS flows or data and/or message types, and/or may require different types of processing (e.g., may have different localities) in accordance with traffic parameters associated with the one or more data packets, among other examples. A first data packet of the transmission buffer may be associated with a set of traffic parameters. A second data packet having the same or similar traffic parameters may be queued outside of the transmission buffer or behind other data packets having different traffic parameters in accordance with when the data packets were obtained. Thus, the second data packet may be queued outside of the buffer (e.g., behind data packets that are to be transmitted without compression (e.g., do not need to be compressed) and or data packets having different traffic parameters and/or processing requirements). Consequently, the transmitting wireless communication device may have to access or perform a same set of compression instructions for two different batches of data packets, which may negatively impact compression efficiency, throughput, and/or spectral efficiency, and may increase latency.

For example, the compressor device may obtain a quantity of video data packets and may intersperse the video data packets with data packets having other types and/or processing requirements based on the order in which the packets are obtained. The compressor device may attempt to identify a pattern for more efficient compression in a batch of data packets having multiple different types such as audio, video, VOIP, TCP ACKs, and/or encrypted, among other examples. Different types of data packets may have different patterns while data packets of the same type may share patterns. Thus, the compressor device may search for more patterns in a batch of data packets having differing types and/or use different compression dictionaries for different batches, which may negatively impact latency. Additionally, the compressor device may receive an indication of an updated dictionary for each different batch having a variety of different data packets, which may negatively impact overhead.

As indicated above, FIG. 4 is provided as an example. Other examples may differ from what is described with regard to FIG. 4.

Figure 5:
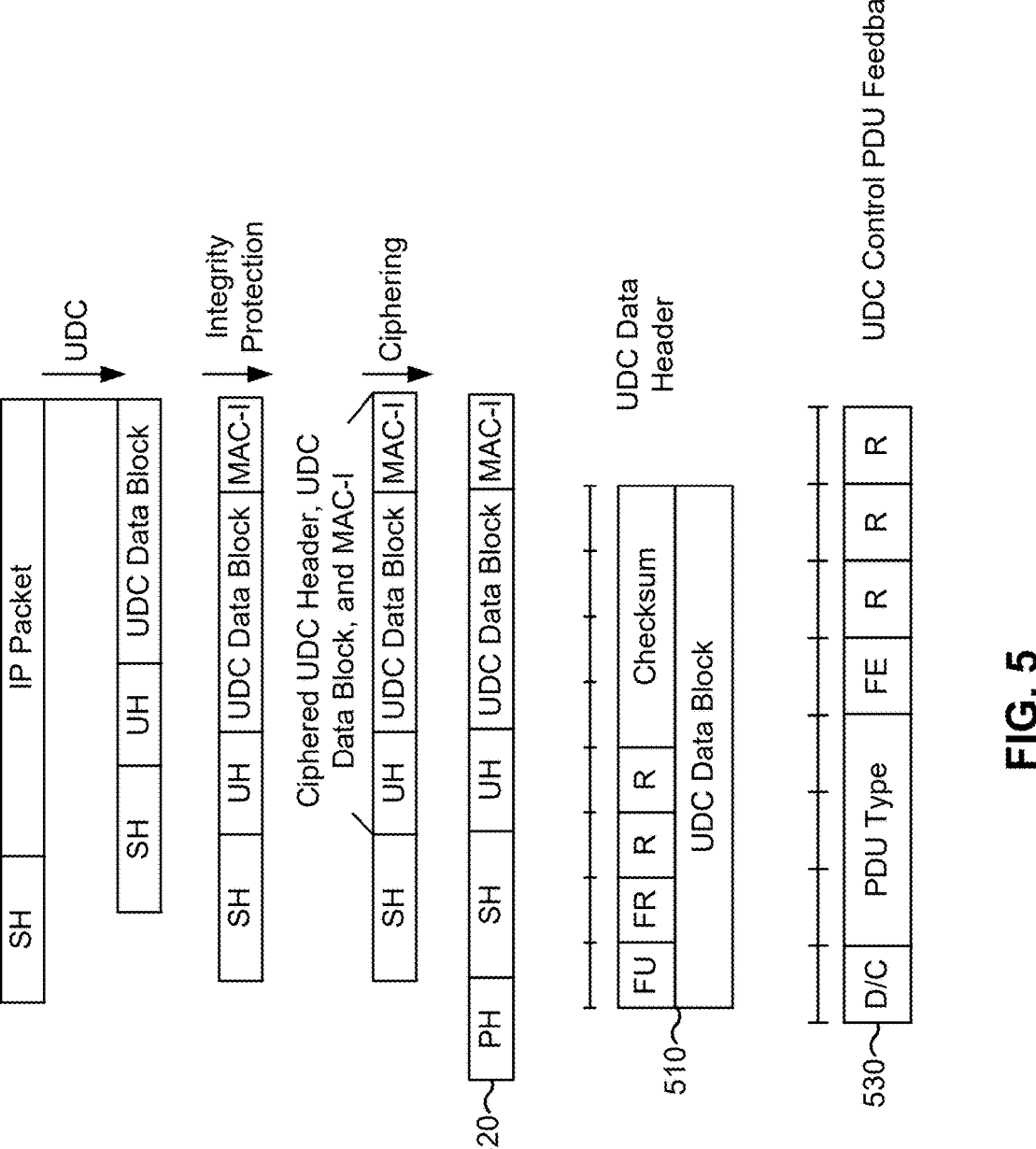
FIG. 5 is a diagram illustrating an example of an uplink data compression (UDC) configuration, in accordance with the present disclosure.

FIG. 5 is a diagram illustrating an example 500 of a UDC configuration, in accordance with the present disclosure.

A variety of compression techniques may be used to perform data compression such as, for example, Huffman coding and/or other "lossless" data compression schemes, such as Lempel-Ziv compression algorithms (e.g., LZ77, among other examples). Lossless compression reduces bits by identifying and eliminating statistical redundancies such that little information (e.g., no information) is lost in lossless compression. In some examples, a default compression scheme may include aspects of multiple compression techniques (e.g., a combination of Huffman coding and LZ77 which may be referred to as "DEFLATE-based UDC"). LZ77 may include duplicate string elimination where sequences of data that are repeated in a compression buffer are compressed and/or eliminated.

Huffman coding is a compression algorithm based on entropy for lossless data compression. Huffman coding may include the use of a variable-length code table for encoding, where the variable-length code table may be derived based on an estimated probability of occurrence for each possible value of the source symbol. In some examples, a static Huffman coding tree (e.g., in which the probabilities are fixed) may be used as a DEFLATE compression configuration. In some examples, the Huffman coding trees for each data block may be independent of the Huffman coding trees used for other data blocks (e.g., block-by-block Huffman coding).

The compression buffer may store and process data packets in the order in which they are obtained and/or routed to the compression buffer (e.g., on a first in, first out basis). In some examples, the compressed packet may depend on preceding compressed packets and thus, to avoid compression and or decompression errors, the compression buffer and the de-compression buffer may be in-sync.

In accordance with the UDC configuration shown in FIG. 5, a compressor device may obtain an IP packet (e.g., an SDU, or multiple SDUs) and may append the IP packet with an SDAP header (SH) to create the basis for a message. The SH may include one or more indications or identifiers to support QoS processing and/or routing. The SH may indicate whether the IP packet includes user data and/or control data, and/or may indicate a QoS flow associated with the IP packet, among other examples. The compressor device may perform data compression on the IP packet (e.g., may refrain from compressing the SH) and may append a UDC header (UH) between the UDC data block and the SH. The UH and the compressed IP packet (e.g., UDC data block) may be referred to collectively as a UDC packet 510.

The UH for the UDC data block may include one or more fields such as at least one fragmentation unit (FU) field, at least one frame (FR) field, one or more fields reserved and/or referenced (R) fields for future use (e.g., may be a space-holder for future enhancements or information fields) and/or for referencing other data, and/or at least one checksum field. The FU field may indicate whether the IP packet (e.g., PDCP SDU) is compressed by UDC protocol. For example, the compressor device may be barred from compressing the IP packet if an uplink data rate prior to compression is higher than an uplink data rate capability of the compressor device. The FR field may indicate to the decompressor device whether the compression buffer has been reset after compression of the IP packet. The checksum field may include an indication for the decompressor device to use in order to verify accuracy of the data after transmission by the compressor device.

The compressor device may perform one or more actions for integrity protection and may append a message authentication code integrity (MAC-I) footer to the UDC data block. The MAC-I footer may include information for integrity verification at a decompressor device.

The compressor device may perform ciphering on the UH, UDC data block, and the MAC-I portion of the message (e.g., may refrain from performing ciphering on the SH). The compressor device may append a PDCP header (PH) to the message based on performing the ciphering. The PH may include information, an indication, and/or information elements related to header compression, ciphering, and/or the integrity protection of data packets.

The compressor device may transmit, and the decompressor device may receive, the message 520 including the PH, the SH, the UH, and the UDC data block. The decompressor device may decompress the UDC data block and may check for any errors in the compressed data based on the checksum field. The decompressor device may transmit, and the compressor device may receive, UDC control PDU feedback 530, which may indicate any checksum errors to the compressor device (e.g., a checksum error caused by the compression and the decompression being out of sync, a checksum error caused by transmission, a checksum error cause by reception, among other examples). The UDC control PDU feedback 530 may include one or more fields such as at least one data/control (D/C) field, at least one PDU field, at least one frame erasure (FE) field, and/or at least one R field.

Such UDC configurations may be used for hypertext transfer protocol (HTTP) Post/Get methods for non-encrypted data, session initiation protocol (SIP), transmission control protocol (TCP)/IP acknowledgement for uplink traffic. However, such UDC configurations may support a single compression buffer per radio bearer (e.g., with a maximum buffer size of 8 KB (8192 bytes)). In some examples, a typical IP packet size may be about 1.5 KB. Thus, at any given time, the buffer may store approximately five IP packets. Because data packets may be routed into the compression buffer in the order in which they are obtained, there may be few or no commonalities (e.g., QoS flow, locality, data type) between data packets stored in a compression buffer at any given time which may negatively affect compression efficiency. For example, the compressor device may obtain at least one video frame and may spend processing resources identifying compression techniques (e.g., including one or more patterns for compression) for video frames, as well as identifying compression techniques for other types of data packets that may be in the buffer.

As another example, the compressor device may obtain at least one TCP acknowledgement packet. A TCP acknowledgement packet may include an indication that the compressor received (or failed to receive) a data packet obtained via TCP. A TCP acknowledgement packet may be transmitted for each data packet obtained or received via TCP. Thus, the compressor may expend processing resources identifying compression techniques (e.g., including one or more patterns and/or sequences for compression) for the at least one TCP acknowledgement packet, as well as identifying compression techniques for other types of data packets that may be in the buffer. That is, the compressor device may not be configured to isolate TCP acknowledgement packets in a single buffer and may indicate differential information regarding whether the data packets were successfully obtained. Further, if the data traffic includes a mixture of encrypted and unencrypted data (e.g., HTTP/hypertext transfer protocol secure (HTTPS)), the compression buffer may store encrypted traffic despite the compressor device not being configured to compress the encrypted data. In some examples, a compression dictionary may be operator-defined independently of any information regarding the traffic properties of the data traffic. In such examples, the operator may choose a single compression dictionary to apply to all types of traffic blindly. In some examples, the compression dictionary may be a SIP-session description protocol for voice calls and/or operator-defined (e.g., identified by a public land mobile network identifier, a version identifier (e.g., which may be defined by a network operator and/or specific to a network), and/or one or more tuples).

Defining the compression dictionary agnostically to traffic properties may prioritize simplicity (e.g., lower overhead signaling, reduced processing in comparison to determining a more appropriate compression dictionary) over compression efficiency. Further, the UDC header may be included even when the data payload ins uncompressed (e.g., uncompressed SDUs), which may inefficiently use spectral throughput as well as time and/or frequency resources.

As indicated above, FIG. 5 is provided as an example. Other examples may differ from what is described with regard to FIG. 5.

Figure 6:
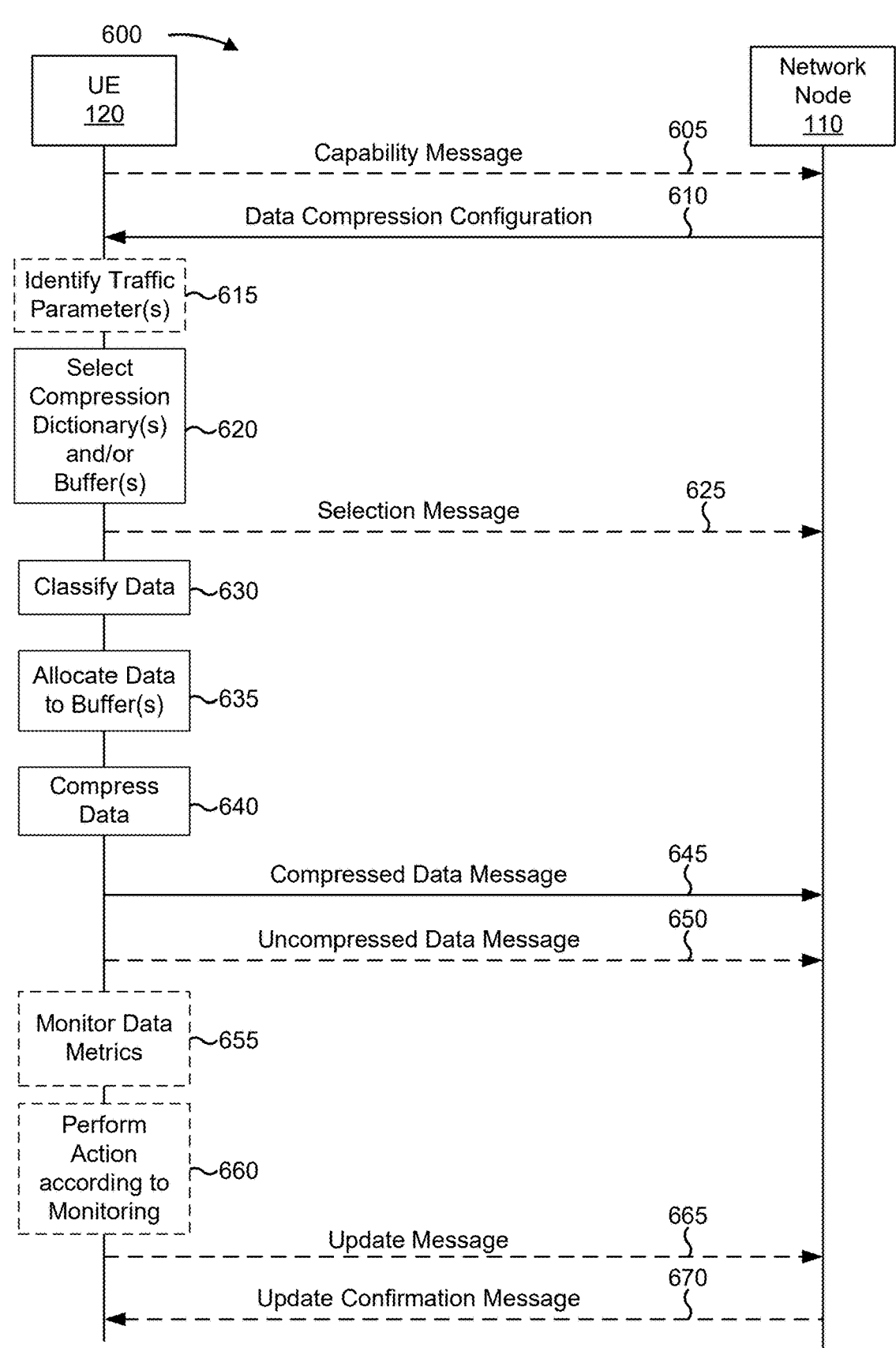
FIG. 6 is a diagram of an example associated with traffic-based data compression, in accordance with the present disclosure.

FIG. 6 is a diagram of an example 600 associated with traffic-based data compression, in accordance with the present disclosure. As shown in FIG. 6, a network node 110 (e.g., network node 110 as described with reference to FIGS. 1-3, a CU, a DU, and/or an RU) may communicate with a UE 120 (e.g., UE 120 as described with reference to FIGS. 1-3). In some aspects, the network node 110 and the UE 120 may be part of a wireless network (e.g., wireless communication network 100). The UE 120 and the network node 110 may have established a wireless connection prior to operations shown in FIG. 6.

The example 600 may illustrate operations for traffic characteristic identification and/or prediction (e.g., using an AI/ML model) to select one or more dictionaries from a set of multiple dictionaries provided, or defined, by a network operator (e.g., network node 110) to compress data. Such operations may avoid the fully dynamic block-by-block Huffman coding (e.g., described with reference to FIG. 5) that uses continuous updating of the compression dictionary (e.g., costing overhead resources). In some aspects, the UE 120 may classify the incoming traffic and allocate the incoming traffic to an appropriate compression buffer, as described in further detail below. By classifying the incoming traffic, the UE 120 may allocate data associated with a given message type (e.g., uplink TCP acknowledgement messages) to a common compression buffer, which may increase compression efficiency. Further, by classifying the traffic, the UE 120 may isolate data that is not compressed (e.g., encrypted traffic) and refrain from routing that data into a compression buffer.

In some examples, the operations shown in FIG. 6 may be performed in a different order or by different devices. In some examples, one or more operations performed by the UE 120 may be performed by the network node 110, or vice versa. In some examples, the operations performed by the UE 120 and/or the network node 110 may be performed by two or more UEs 120. Further, while the operations shown in FIG. 6 demonstrate UDC (e.g., the compression of uplink data for uplink communications), the techniques described herein may similarly apply to downlink data compression (e.g., the compression of downlink data for downlink communications) and/or sidelink data compression (e.g., the compression of sidelink data for sidelink communications). As used herein, "data" may refer to one or more data packets comprising control and/or data information, and/or any other unit of data including data and/or control information.

As shown by reference number 605, the UE 120 may transmit, and the network node 110 may receive, a capability message. The capability message may indicate whether the UE 120 supports a feature and/or one or more parameters related to the feature. For example, the capability information may indicate a capability and/or parameter for traffic-based data compression. As another example, the capability message may indicate a capability and/or parameter for one or more compression dictionaries and/or one or more compression buffers. One or more operations described herein may be based on capability information of the capability message. For example, the UE 120 may perform a communication in accordance with the capability information, or may receive configuration information that is in accordance with the capability information.

In some aspects, the capability message may include a UDC capability and/or a set of one or more supported compression dictionaries. In some aspects, the set of one or more supported compression dictionaries may include multiple compression dictionaries. In some aspects, the capability message may include and/or indicate one or more tuples indicating the set of supported compression dictionaries. In some aspects, the capability message may include and/or indicate one or more identifiers (e.g., public land mobile network identifiers and/or version identifiers (e.g., which may be defined by a network operator and/or specific to a network)) indicating the set of supported compression dictionaries.

In some aspects, the capability message may indicate: whether AI/ML-based UDC (e.g., the compression of data based on one or more parameters predicted using an AI/ML model and/or the compression of data using an AI/ML model) is supported; a quantity of compression buffers supported by the UE 120; a total compression buffer size supported by the UE 120; an individual compression buffer size (e.g., capacity to store data) supported by the UE 120; one or more AI/ML dictionaries supported by the UE 120;

one or more computational dictionaries supported by the UE 120; whether dynamic compression dictionary updating is supported by the UE 120; and/or an uplink data rate supported by the UE 120.

As shown by reference number 610, the network node 110 may transmit, and the UE 120 may receive, configuration information. In some aspects, the UE 120 may receive the configuration information via one or more of system information (e.g., a master information block (MIB) and/or a system information block (SIB), among other examples), RRC signaling, MAC signaling (e.g., one or more MAC-CEs), and/or downlink control information (DCI), among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

The network node 110 may transmit, and the UE 120 may receive, configuration information associated with UDC. In some aspects, the UDC may be associated with and/or indicate multiple compression dictionaries and/or multiple compression buffers.

In some aspects, the configuration information may indicate a quantity of enabled compression buffers. For example, the configuration information may indicate a maximum number of compression buffers that the UE 120 may select and/or use for data compression. In some aspects, the configuration information may include an information element (e.g., Maximum-Number-of-Buffers), which may indicate the quantity of enabled compression buffers. In some aspects, the UE 120 may select a quantity of buffers that includes fewer compression buffers than the indicated quantity of compression buffers (e.g., based on the traffic parameters).

In some aspects, the configuration information may indicate an individual compression buffer size for each of the multiple compression buffers. For example, the configuration information may indicate a maximum compression buffer size for each selected compression buffer. In some aspects, the configuration information may include an information element (e.g., BufferSize), which may indicate the individual compression buffer size for each of the multiple compression buffers. In some aspects, the UE 120 may implement an individual compression buffer size that is smaller than the indicated buffer size (e.g., based on the traffic parameters).

In some aspects, the configuration information may indicate a total compression buffer size for the multiple compression buffers. For example, the configuration information may indicate a maximum total compression buffer size of all of the selected compression buffers. In some aspects, the configuration information may include an information element (e.g., BufferSize), which may indicate the total compression buffer size. In some aspects, the UE 120 may implement a total compression buffer size that is smaller than the indicated total compression buffer size (e.g., based on the traffic parameters).

In some aspects, the configuration information may indicate a set of enabled compression dictionaries including the multiple compression dictionaries. For example, the configuration information may include a list of supported compression dictionaries from which the UE 120 may select. In some aspects, the configuration information may include an information element (e.g., SupportedDictionaries), which may indicate the set of enabled compression dictionaries. In some aspects, the UE 120 may select the multiple compression dictionaries to be a subset of the set of enabled compression dictionaries (e.g., based on the traffic parameters).

In some aspects, the configuration information may indicate whether dynamic compression dictionary updating is enabled. For example, the configuration information may indicate that the UE 120 may select and/or implement dynamic dictionaries. That is, the UE 120 may reselect the multiple compression dictionaries (e.g., depending on the one or more traffic parameters and/or depending on updated traffic parameters for subsequent communications). In some aspects, the configuration information may include an information element (e.g., SupportedDictionaries), which may indicate whether dynamic compression dictionary updating is enabled. In some aspects, the indication having a value "{all}" may indicate that the UE 120 may select and/or implement dynamic dictionaries. In some aspects of dynamic dictionary updating, a header of the compressed data may include information associated with the selected dictionary and/or may indicate a change in the selected dictionary (e.g., with respect to a previous dictionary used for compression).

In some aspects, the configuration information may indicate whether AI/ML prediction of the one or more traffic parameters (e.g., associated with the uplink data for UDC) is enabled. For example, the configuration information may indicate the activation or deactivation of AI/ML behavior. In some aspects, the configuration information may include an information element (e.g., AIML-Enabled), which may indicate whether the AI/ML prediction of the one or more traffic parameters is enabled. In some aspects, the UE 120 may determine to opt out of using and/or performing AI/ML prediction of the one or more traffic parameters when the configuration information has enabled AI/ML prediction (e.g., based on the traffic parameters).

In some aspects, the configuration information may indicate whether computational prediction (e.g., prediction using a computational model) of the one or more traffic parameters (e.g., associated with the uplink data for UDC) is enabled. For example, the configuration information may indicate the activation or deactivation of computational prediction. In some aspects, the configuration information may include an information element, which may indicate whether the computation prediction of the one or more traffic parameters is enabled. In some aspects, the UE 120 may opt out of using and/or performing computational prediction of the one or more traffic parameters when the configuration information has enabled computational prediction (e.g., based on the traffic parameters).

In some aspects, the configuration information may indicate one or more QoS flows enabled for UDC. For example, the configuration information may include and/or indicate one or more QoS flows which the UE 120 is enabled to compress. In some aspects, the configuration information may include an information element (e.g., QoS-flow-allowed), which may indicate which QoS flows the UE 120 is enabled to compress. In some aspects, the UE 120 may determine to perform compression on a subset of the one or more QoS flows enabled for UDC (e.g., based on the traffic parameters).

In some aspects, the configuration information may indicate a compression ratio performance metric. For example, the configuration information may indicate a threshold compression ratio and/or range of compression ratios the UE 120 is to achieve when compressing data. In some aspects, the compression ratio performance metric may be a key performance metric for UDC by the UE 120. In some aspects, the configuration information may include an information element (e.g., MinimumCompressionRatio), which may indicate the compression ratio performance metric. In some aspects, the UE 120 may fail to meet the compression ratio performance metric when performing UDC and may perform one or more actions to increase UDC performance (e.g., as described below with regard to reference number 660).

In some aspects, the configuration information may indicate a compression dictionary reset rate performance metric. For example, the configuration information may indicate a threshold reset rate and/or range of reset rates that the UE 120 is enabled to perform. That is, the UE 120 may fail to meet the compression dictionary reset rate performance metric if the UE 120 reselects and/or resets the one or more compression dictionaries too infrequently (e.g., as determined based on the compression dictionary reset rate performance metric). In some aspects, the compression dictionary reset rate performance metric may be a key performance metric for a quantity of dictionary updates that the UE 120 is enabled to perform. In some aspects, the configuration information may include an information element (e.g., MinimumDictionaryResetRate), which may indicate the compression dictionary reset rate performance metric. In some aspects, the UE 120 may fail to meet the compression dictionary reset rate performance metric when performing UDC, and may perform one or more actions to increase UDC performance (e.g., as described below with regard to reference number 660).

In some aspects, the configuration information may indicate a compression buffer reset rate performance metric. For example, the configuration information may include and/or indicate a threshold reset rate and/or range of reset rates the UE 120 is enabled to perform. That is, the UE 120 may fail to meet the compression buffer reset rate performance metric if the UE 120 reselects and/or resets the compression buffers too infrequently (e.g., as determined based on the compression dictionary reset rate performance metric). In some aspects, the compression buffer reset rate performance metric may be a key performance metric for a quantity of buffer updates the UE 120 is enabled to perform. In some aspects, the configuration information may include an information element (e.g., MinimumBufferResetRate), which may indicate the compression buffer reset rate performance metric. In some aspects, the UE 120 may fail to meet the compression buffer reset rate performance metric when performing UDC, and may perform one or more actions to increase UDC performance (e.g., as described below with regard to reference number 660).

In some aspects, the configuration information may indicate a compression dictionary update timing performance metric. For example, the configuration information may include and/or indicate a threshold timing and/or range of timings for dictionary updating that the UE 120 is enabled to perform. That is, the UE 120 may fail to meet the compression dictionary update timing performance metric if the UE 120 performs dictionary updating and/or reselection too slowly (e.g., as determined based on the compression dictionary update timing performance metric). In some aspects, the compression dictionary update timing performance metric may be a key performance metric for a timing of compression dictionary updating that the UE 120 is enabled to perform. In some aspects, the configuration information may include an information element (e.g., MinimumTimeToUpdateDictionary), which may indicate the compression dictionary update timing performance metric. In some aspects, the UE 120 may fail to meet the compression dictionary update timing performance metric when performing UDC, and may perform one or more actions to increase UDC performance (e.g., as later described with regard to reference number 660.

In some aspects, the configuration information may indicate a data rate performance metric. For example, the configuration information may include and/or indicate a data rate and/or range of data rates that the UE 120 is to achieve when compressing data. In some aspects, the data rate performance metric may be a key performance metric for UDC by the UE 120. In some aspects, the configuration information may include an information element (e.g., MinimumDataRateSupported), which may indicate the data rate performance metric. In some aspects, the UE 120 may fail to meet the data rate performance metric when performing UDC, and may perform one or more actions to increase UDC performance (e.g., as later described with regard to reference number 660.

The UE 120 may configure itself based at least in part on the configuration information. In some aspects, the UE 120 may be configured to perform one or more operations described herein based at least in part on the configuration information. For example, the UE 120 may perform data compression in accordance with any one of the parameters and/or configurations indicated by the configuration information.

In some aspects, the configuration information described in connection with reference number 610 and/or the capability message described in connection with reference number 605 may include information transmitted via multiple communications. Additionally, or alternatively, the network node 110 may transmit the configuration information, or a communication including at least a portion of the configuration information, before and/or after the UE 120 transmits the capability message. For example, the network node 110 may transmit a first portion of the configuration information before the capability message, the UE 120 may transmit at least a portion of the capability message, and the network node 110 may transmit a second portion of the configuration information after receiving the capability message.

As shown by reference number 615, the UE 120 may identify one or more traffic parameters of uplink data obtained by the UE 120 for UDC and communication. The one or more traffic parameters may include information, such as a type of data or data packet (e.g., a message type), where the type of a data packet may be defined by the type of data, control information, or message contained in the packet (e.g., an uplink transmission control protocol acknowledgement packet, a transmission control protocol acknowledgement packet, an encrypted data packet, an unencrypted data packet, a QoS packet, a voice packet, a video packet, a broadcast packet, a multicast packet, a user data packet, fragmented packets, among other examples). Additionally, or alternatively, the one or more traffic parameters may include a packet size (e.g., measured in bits and/or bytes), a packet arrival time, a packet departure time, an end-to-end delay, jitter, packet loss, packet error rate, throughput, sequence number, QoS flow (e.g., category, class, and/or tag), and/or a traffic class, among other examples.

In some aspects, the UE 120 may predict the one or more traffic parameters of the uplink data using an AI/ML model. In some examples, the UE 120 may predict the one or more traffic parameters using an AI/ML model in accordance with one or more AI/ML dictionaries indicated via the capability message as supported by the UE 120. As used herein, "AI/ML dictionary" may refer to a dataset associated with an AI/ML model, a configuration of an AI/ML model, a scenario of an AI/ML model, a codebook of or associated with an AI/ML model, a functionality of an AI/ML model, and/or or an identifier of an AI/ML model, among other examples.

In some other aspects, the UE 120 may predict the one or more traffic parameters of the uplink data using a computational model. For example, the UE 120 may predict the one or more traffic parameters of the uplink data using a mathematical or algorithmic representation of a system and/or process that is designed to predict outputs using various inputs (e.g., otherwise known as a computational model). In some aspects described herein, action performed by the AI/ML model may be additionally or alternatively performed by a computational model. In some examples, the UE 120 may predict the one or more traffic parameters using a computational model in accordance with one or more computational model dictionaries indicated via the capability message as supported by the UE 120. As used herein, "computational dictionary" may refer to a dataset associated with a computational model, a configuration of a computational model, a scenario of a computational model, a codebook of or associated with a computational model, a functionality of a computation model, and/or or an identifier of a computational model, among other examples.

As shown by reference number 620, the UE 120 may select, in accordance with the one or more traffic parameters, one or more compression dictionaries and/or a compression buffer. For example, the UE 120 may select one or more compression dictionaries of the multiple compression dictionaries (e.g., the multiple compression dictionaries indicated via the capability message described in association with reference number 605) and/or a compression buffer of the multiple compression buffers (e.g., the multiple compression dictionaries indicated via the capability message described in association with reference number 605) for compressing the uplink data.

In some aspects, the UE 120 may select one or more compression buffers of the multiple compression buffers for compressing the uplink data. In some aspects, a quantity of the one or more compression buffers may be based on the quantity of enabled compression buffers indicated by the configuration information (e.g., as described in connection with reference number 610).

In some aspects, the UE 120 may select the one or more compression dictionaries for compressing uplink data using a version identifier of the one or more compression dictionaries or a version identifier of each of the one or more compression dictionaries. In some aspects, the version identifier may be defined by an operator of the wireless network (e.g., defined by an operator of the wireless communication network 100) and/or may be specific to a wireless network (e.g., specific to wireless communication network 100). In some aspects, the UE 120 may select the one or more compression dictionaries in accordance with a QoS flow of the uplink data.

In some aspects, selecting the compression buffer may include and/or be based on receiving an indication of a default compression buffer. In some aspects, the UE 120 may select (e.g., use) the default compression buffer. In some aspects, the UE 120 may receive the indication of the default compression buffer in the configuration message described with regard to reference number 610 and/or via separate control signaling or message.

In some aspects, the UE 120 may select the compression buffer based on a QoS flow of the uplink data obtained by the UE 120 for UDC and communication. For example, some compression buffers may be dedicated to certain QoS flows. In some aspects, the UE 120 may select the compression buffer based on a type (e.g., IP, TCP ACK, video, real-time) of the uplink data obtained by the UE 120 for UDC and communication. For example, some compression buffers may be dedicated to certain data types. In some aspects, the UE 120 may select the compression buffer based on a size of the uplink data obtained by the UE 120 for UDC and communication. For example, some compression buffers may be configured to compress large data and/or small data. In some aspects, the UE 120 may select the compression buffer based on any other traffic parameter of the uplink data obtained by the UE 120 for UDC and communication. For example, some compression buffers may be configured to compress data having certain traffic parameters.

As shown by reference number 625, in some examples, the UE 120 may transmit, and the network node 110 may receive, a selection message. For example, the UE 120 may transmit an indication of the one or more compression dictionaries or the compression buffer (e.g., the compression buffer and/or the one or more compression buffers selected in accordance with the quantity of enabled compression buffers) selected in association with the one or more traffic parameters of the uplink data (e.g., the one or more traffic parameters described with regard to reference number 615).

In such examples, the UE 120 may select the compression buffer (e.g., as part of the selection described with regard to reference number 620 or otherwise) in accordance with a QoS flow indicator-to-buffer mapping associated with a QoS flow of the uplink data. In such aspects, the selection message may include control signaling that includes an indication of the QoS flow indicator-to-buffer mapping. That is, the UE 120 may transmit, and the network node 110 may receive, control signaling indicating the QoS flow indicator-to-buffer mapping. As a result, the network node 110 may identify the compression buffer used by the UE 120 to compress the uplink data in accordance with the mapping and a QoS flow associated with the uplink data. In some aspects, the control signaling may include RRC signaling and/or packet data convergence protocol control signaling.

As shown by reference number 630, the UE 120 may classify the data. For example, the UE 120 may classify, prior to compressing the uplink data, the uplink data in accordance with the one or more traffic parameters predicted by the AI/ML model and/or the computational model. In some aspects, the UE 120 may classify the uplink data in accordance with a message type. For example, the uplink data may include one or more messages, and at least one compression buffer may be associated with a message type. In such aspects, the UE 120 may classify, in accordance with the one or more traffic parameters (e.g., identified in association with reference number 615), the one or more messages as being associated with the message type. Thus, the one or more messages may be associated with (or subsequently allocated to) a compression buffer having or associated with the same message type.

As shown by reference number 635, the UE 120 may allocate the classified data to compression buffer of the multiple compression buffers. For example, the UE 120 may allocate the uplink data to the compression buffer (e.g., of the multiple compression buffers) that is associated with the identified class of the uplink data. In some examples, the AI/ML model may indicate which buffer to allocate the uplink data to in accordance with the classification. In some aspects, the UE 120 may allocate the one or more messages to the compression buffer in association with classifying the one or more messages as being associated with the message type (e.g., a same message type). In some aspects, the message type may be an uplink transmission control protocol acknowledgement message type and/or any other message type described herein.

In some aspects, the UE 120 may classify, prior to compressing the uplink data (e.g., as described with regard to reference number 630), the uplink data using the AI/ML model and/or the computational model. The UE 120 may allocate the uplink data to the compression buffer of the multiple compression buffers in accordance with classifying the uplink data using the AI/ML model. In some aspects, the AI/ML model may predict and/or identify the message type associated with the uplink data. In such examples, the UE 120 may allocate the uplink data to the compression buffer of the multiple compression buffers in accordance with classifying the uplink data in accordance with the message type predicted and/or identified by the AI/ML model.

As shown by reference number 640, the UE 120 may compress the data. For example, the UE 120 may compress, in accordance with the configuration information (e.g., as described in connection with reference number 610), uplink data to generate compressed uplink data via the one or more compression dictionaries of the multiple compression dictionaries and/or a compression buffer of the multiple compression buffers. In some aspects, a header of the compressed uplink data (e.g., a UDC header, an SDAP header, a PDCP header) may indicate the compression buffer, the one or more compression dictionaries, and/or information associated with the one or more compression dictionaries.

The UE 120 may perform compression using a quantity of compression buffers that is less than or equal to the quantity of enabled compression buffers indicated via the configuration information. The UE 120 may perform compression using an individual compression buffer size that is less than or equal to the individual compression buffer size for each of the multiple compression buffers indicated via the configuration information. The UE 120 may perform compression using a total compression buffer size (e.g., an aggregated capacity of compression buffers) that is less than or equal to the total compression buffer size for the multiple compression buffers indicated via the configuration information. The UE 120 may perform compression using a subset of the set of enabled compression dictionaries indicated via the configuration information. The UE 120 may perform compression based on or after dynamic updating of the one or more compression dictionaries in accordance with dynamic update being enabled by the configuration information. The UE 120 may perform compression using an AI/ML model to predict the one or more traffic parameters. The UE may perform data compression based on classifying the uplink data in accordance with one or more QoS flows enabled by the configuration information. Such flexible compression behavior by the UE 120 may positively impact throughput, user experience, and/or spectral efficiency, and may decrease latency by using techniques to adaptively compress uplink data to accommodate the traffic parameters of the uplink data.

As shown by reference number 645, the UE 120 may transmit, and the network node 110 may receive, a compressed data message. For example, the UE 120 may transmit, and the network node 110 may receive, an uplink communication that includes the compressed uplink data. In some aspects, the uplink communication may include a packet header (e.g., a PDCP header, an SDAP header) that indicates a presence of a compression header (e.g., UDC header). For example, the indication of the presence of the compression header may indicate to the network node 110 that at least a portion of the uplink communication is compressed.

As shown by reference number 650, in some examples, the UE 120 may transmit, and the network node 110 may receive, an uncompressed data message. For example, the UE 120 may obtain encrypted data for uplink data transmission. As described in association with reference number 615, the UE 120 may predict one or more traffic parameters of the encrypted data using the AI/ML model and/or the computational model. As described in association with reference number 630, the UE 120 may classify, in accordance with the one or more traffic parameters of the encrypted data predicted by the AI/ML model and/or the computational model, the encrypted data as encrypted traffic. In such examples, the UE 120 may refrain from compressing the encrypted data. Thus, the UE 120 may transmit the uncompressed encrypted data along with or as part of the uplink communication including the compressed data message, as described in connection with reference number 645. Alternatively, the UE 120 may transmit, and the network node 110 may receive, a second uplink communication including the uncompressed encrypted data.

In some aspects, the UE 120 may refrain from compressing second uplink data. For example, as shown by reference number 650, the UE 120 may transmit, and the network node 110 may receive, a second uplink communication that includes the second uplink data in accordance with refraining from compressing the second uplink data. In some such examples, the second uplink communication may include a packet header (e.g., a PDCP header, an SDAP header) that indicates an absence of a compression header (e.g., UDC header) for the second uplink data.

As shown by reference number 655, in some examples, the UE 120 may monitor data metrics associated with the data compression. For example, the UE 120 may monitor data associated with a set of data categories in association with compressing the uplink data. In some aspects, the data categories may include an identifier for each of the one or more compression dictionaries used to compress the uplink data; an identifier of the compression buffer used to compress the data; the one or more traffic parameters of the uplink data; a compression ratio (e.g., a relative reduction in a size of the data); a quantity of compression dictionary resets (e.g., a quantity of occasions in which the UE 120 switched from using one compression dictionary to another); a quantity of compression buffer resets (e.g., a quantity of occasions in which the UE 120 switched from using one compression buffer (or, for example, set of compression buffers) to another); one or more timestamps associated with compressing the uplink data; and/or metadata associated with compressing the uplink data. In some aspects, the UE 120 may report the monitored data metrics associated with the data compression to a server associated with the AI/ML model. For example, the UE 120 may report the data, associated with the set of data categories in, association with compressing the uplink data to an AI/ML server and/or another server associated with the AI/ML model. In some aspects, the AI/ML server may train the AI/ML model using the data and/or may train a corresponding AI/ML model hosted by another device.

In some aspects, the UE 120 may identify that data associated with at least one data category of the set of data categories fails to meet a performance metric (e.g., a key performance indicator). In some examples, the configuration information described in connection with reference number 610 may indicate one or more performance metrics. If the UE 120 fails to meet and/or satisfy the performance metric, then a response from the UE 120 may be triggered. For example, the UE 120 may perform one or more actions based on failing to meet and/or satisfy the performance metric. The performance metric may include a compression ratio performance metric (e.g., a threshold compression ratio and/or range of ratios), a compression dictionary reset rate performance metric (e.g., a threshold rate and/or range of rates for resetting or switching from using the one or more compression dictionaries to one or more other compression dictionaries), a compression buffer reset rate performance metric (e.g., a threshold rate and/or range of rates for resetting or switching from using the compression buffer to one or more other compression buffers), and/or a compression dictionary update performance metric (e.g., a threshold time or range of durations for updating the one or more compression dictionaries), among other examples.

As shown by reference number 660, in some examples, the UE 120 may perform one or more actions in accordance with the monitoring. For example, the UE 120 may perform an action in association with identifying that the data fails to meet a performance metric (e.g., in accordance with the monitoring as shown by reference number 655). In some examples, the UE 120 may perform one or more actions based on a compression ratio associated with the compression of data, described in connection with reference number 640, failing to meet and/or satisfy the compression ratio performance metric. In some examples, the UE 120 may perform one or more actions based on a compression buffer reset rate (e.g., associated with the compression of data described in connection with reference number 640 and/or associated with the selection of the compression buffer described in connection with reference number 620) failing to meet and/or satisfy the compression dictionary reset rate performance metric. In some examples, the UE 120 may perform one or more actions based on a compression dictionary reset rate (e.g., associated with the compression of data described in connection with reference number 640 and/or associated with the selection of the one or more compression dictionaries described in connection with reference number 620) failing to meet and/or satisfy the compression buffer reset rate performance metric. In some examples, the UE 120 may perform one or more actions based on a compression dictionary update timing (e.g., associated with the compression of data described in connection with reference number 640 and/or associated with the selection of the one or more compression dictionaries described in connection with reference number 620) failing to meet and/or satisfy the compression dictionary update timing performance metric.

In some examples, the action performed according to the monitoring (e.g., as shown by reference number 660) may include the UE 120 training the AI/ML model using the data monitored in association with compressing the uplink data. In some aspects, performing the action in association with identifying that the data fails to meet a performance metric may include the UE 120 disabling a first AI/ML model and/or enabling a second AI/ML model. In some aspects, performing the action in association with identifying that the data fails to meet a performance metric may include the UE 120 selecting at least one of one or more second compression dictionaries and/or a second compression buffer.

As shown by reference number 660, in some examples, performing the action in association with identifying that the data fails to meet a performance metric may include the UE 120 resetting, for subsequent UDC, the one or more compression dictionaries to a default compression dictionary and/or the compression buffer to a default compression buffer. For example, the UE 120 may fall back to using an operator-defined compression dictionary and/or may reset the compression buffers to a single buffer (e.g., may reset the buffer to a single buffer storing all zeros as a baseline reset). In some aspects, performing the action in association with identifying that the data fails to meet a performance metric may include the UE 120 transmitting a performance failure report (e.g., to the network node and/or the AI/ML server and/or host). For example, the UE 120 may report data metrics associated with the data compression in association with identifying that the data fails to meet a performance metric and/or may report the performance failure report in association with identifying that the data fails to meet a performance metric.

In some aspects, performing the action in association with identifying that the data fails to meet a performance metric may include the UE 120 disabling UDC associated with a radio bearer of the uplink data. In such aspects, the UE 120 may be configured with one or more radio bearers (e.g., including the radio bearer) for communicating with one or more other wireless communication devices. For example, the UE 120 may not perform UDC for uplink data to be communicated via the radio bearer associated with the data that failed to meet the performance metric.

As shown by reference number 665, in some examples, the UE 120 may transmit, and the network node 110 may receive, an update message. For example, the UE 120 may transmit a UDC update including an indication of a second one or more compression dictionaries of the multiple compression dictionaries, a second compression buffer of the multiple compression buffers, an updated compression buffer size of the compression buffer, a compression buffer size of the second compression buffer, and/or an updated quantity of compression buffers used for compression by the UE 120. That is, the UE 120 may request that one or more parameters, or configurations indicated by the data compression configuration, as described in connection with reference number 610, be changed and/or updated for subsequent data compression by the UE 120. In some aspects, the update message may be communicated via control signaling (e.g., RRC signaling, and/or PDCP signaling, among other examples).

In some examples, the update message may be included in or communicated via PDCP in-band signaling such that an updated compression dictionary may be applied from a correct SN. In some examples, the update message may be included in or communicated via a combination of RRC signaling and PDCP signaling, which may signal the beginning of the UE 120 applying the updated compression dictionary for UDC.

As shown by reference number 670, in some examples, the UE 120 may receive, and the network node 110 may transmit, an update confirmation message. For example, the network node 110 may transmit, and the UE 120 may receive, an indication accepting or rejecting the UDC update. That is, the update confirmation message may accept or reject the use of the second one or more compression dictionaries, the second compression buffer, the updated compression buffer size of the compression buffer, the compression buffer size of the second compression buffer, and/or the updated quantity of compression buffers for subsequent data compression.

As indicated above, FIG. 6 is provided as an example. Other examples may differ from what is described with respect to FIG. 6.

Figure 7:
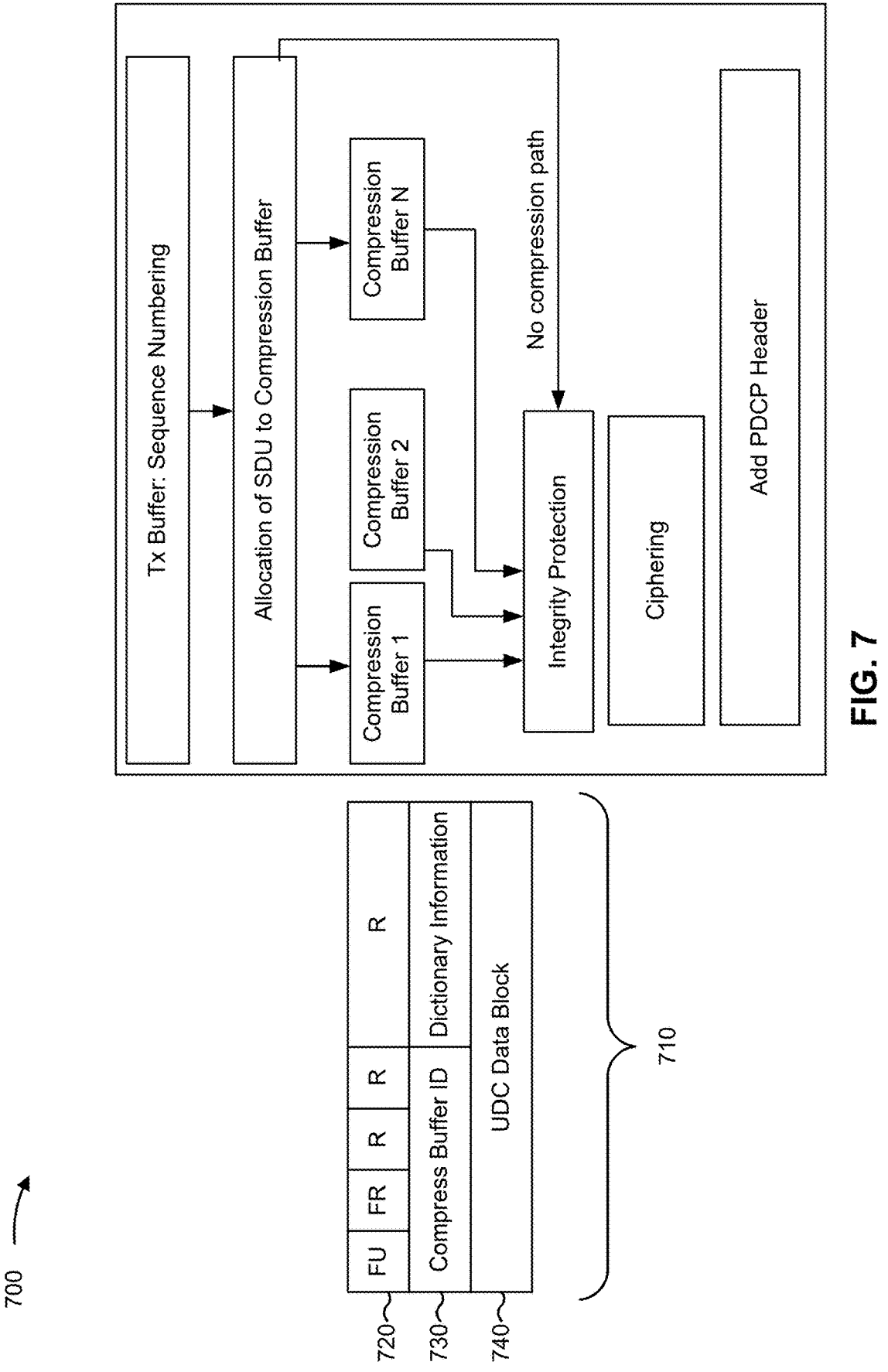
FIG. 7 is a diagram illustrating an example associated with a traffic-based UDC configuration, in accordance with the present disclosure.

FIG. 7 is a diagram illustrating an example 700 associated with a traffic-based UDC configuration, in accordance with the present disclosure. Example 700 includes aspects of communication between a network node and a UE. In some aspects, network node and the UE may be included in a wireless network, such as the wireless communication network 100. The traffic-based UDC configuration may illustrate a UDC configuration in which multiple compression buffers are enabled at a UE.

The UE may obtain data traffic (e.g., including one or more SDUs) and may route the data traffic into a transmission buffer where the data traffic may be associated with a sequence numbering (e.g., identifier). The UE may use an AI/ML model (e.g., as described with reference to FIGS. 6 and 9) to classify the data traffic obtained by the UE. The UE may allocate (e.g., independently or using the AI/ML model) the obtained data traffic to a most appropriate compression buffer (e.g., a compression buffer dedicated or allocated to compressing data traffic associated with one or more traffic parameters, such as a particular type of data message). For example, the UE may allocate one or more SDUs of the data traffic to a first compression buffer and may allocate one or more other SDUs of the data traffic to a second compression buffer based on one or more parameters associated with the one or more SDUs and/or the one or more other SDUs. In some aspects, the UE may route data traffic that is to be transmitted uncompressed from the transmission buffer to a module for integrity protection. Thus, the UE may conserve memory storage of one or more compression buffers by refraining from routing data traffic that is to be transmitted uncompressed into a compression buffer.

The UE may perform data compression on the data traffic to obtain a UDC data block 740 and may append two or more UHs 720 and/or 730 to the UDC data block 740. The UHs 720 and 730 and the UDC data block 740 may be referred to collectively as a UDC packet 710.

The UDC packet 710 may include a first UH 720. The first UH 720 may include one or more fields such as at least one FU field, at least one FR field, one or more fields reserved and/or R fields for future use (e.g., may be a space-holder for future enhancements or information fields) and/or for referencing other data, and or at least one checksum field, as described with reference to FIG. 5. Additionally, or alternatively, the UDC packet 710 may include a second UH 730. The second UH 730 may include an indication of one or more compression dictionaries, selected from multiple compression dictionaries by the UE, for UDC. Additionally, or alternatively, the second UH 730 may include an indication of one or more compression buffers, selected from multiple compression buffers by the UE, for UDC. The network node may identify the selected one or more dictionaries and/or buffer for incoming compressed data traffic based on the second UH 730. In some aspects, the second UH 730 may indicate the dynamic selection of one or more compression dictionaries. For example, the dictionary information of the second UH 730 may indicate dictionary information such as an identifier or a change in the dictionary used for the UDC data block 740 from the dictionary used for a previous UDC data block.

In some aspects, the UE may identify a control mapping for a QoS flow to compression dictionary (e.g., instead of arbitrarily classifying traffic). In some aspects, the UE may identify or receive an indication of a QoS flow indicator to compression buffer mapping. In some examples, the indication of the QoS flow indicator to compression buffer mapping may be communicated via control signaling (e.g., via RRC signaling and/or PDCP control signaling, among other examples).

In some aspects, the network node may indicate a buffer as a default buffer for a particular radio bearer of the UE. Thus, the network may assume, without any PDCP control PDUs, that all other flows and/or QoS flow indicators which are not indicated explicitly (e.g., by a mapping or otherwise) may be routed through the default compression buffer for the radio bearer.

As indicated above, FIG. 7 is provided as an example. Other examples may differ from what is described with respect to FIG. 7.

FIG. 8 is a diagram illustrating an example 800 associated with removing and/or omitting headers for uncompressed data, in accordance with the present disclosure. As shown in FIG. 8, example 800 includes a compressed data message 810 and an uncompressed data message 820.

In accordance with example 800, a compressed data message 810 may include a PH that indicates the presence of a UH. For example, the PH may include a field, an indication, and/or an information element, such as "NH" which may indicate whether there is a "next header." "NH" having a value of "UDC" may indicate to a receiving device that the compressed data message 810 includes a UH.

In such examples, the UH of the compressed data message 810 may indicate that there are no subsequent headers in the compressed data message 810. For example, the UH may include a field, an indication, and/or an information element, such as "NH" which may indicate whether there is a "next header." "NH" having a value of "none" may indicate to a receiving device that there are no further headers in the compressed data message 810. In some examples, a single bit may indicate the presence of a next header and/or a UDC header.

In accordance with example 800, an uncompressed data message 820 may include a PH that indicates the absence of a UH and therefore may indicate or imply to a receiving device that the uncompressed data message 820 is uncompressed. In such examples, the receiving device may refrain from decompressing the uncompressed data message 820. For example, the PH may include a field, an indication, and/or an information element, such as "NH" which may indicate whether there is a "next header." "NH" having a value of "none" may indicate to the receiving device that there are no further headers in the uncompressed data message 820.

The UE 120 may conserve overhead by omitting the compression header for the uncompressed data message 820. Further, by indicating to the network node that the uncompressed data message 820 does not include a compression header, the network node may conserve resources that may otherwise by used to process the compression header. In some aspects, the omitted compression header may indicate to the network node that the uncompressed data message 820 is uncompressed. As a result, the network node may avoid attempting to decompress the uncompressed data message 820, which may conserve time and/or processing resources.

As indicated above, FIG. 8 is provided as an example. Other examples may differ from what is described with respect to FIG. 8.

Figure 9:
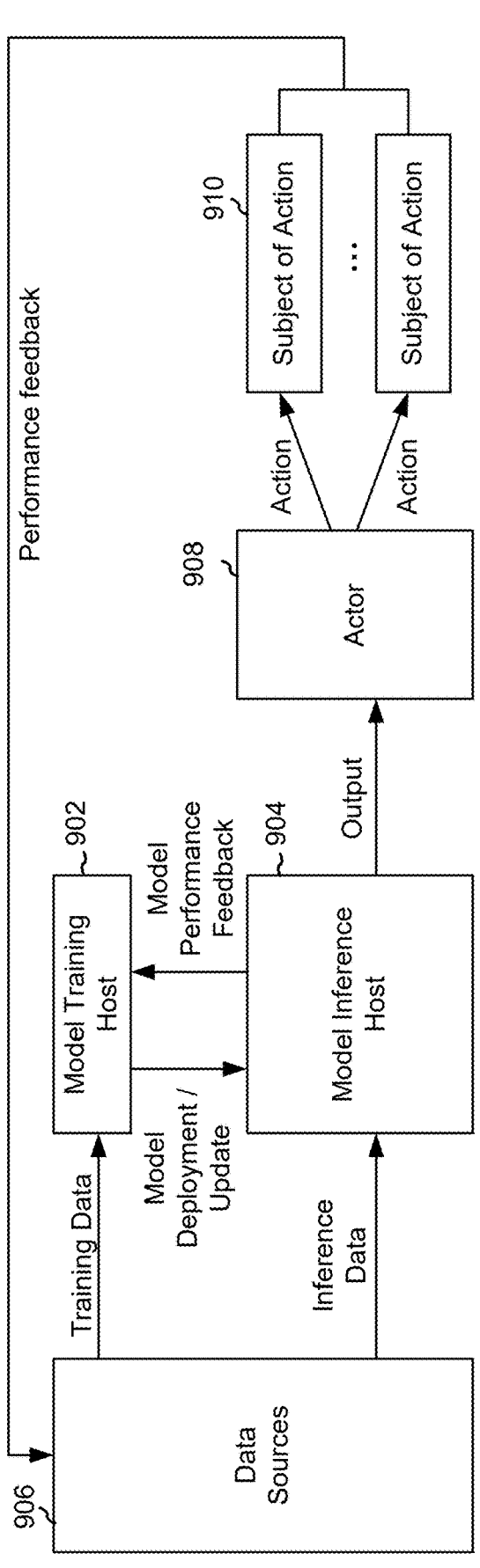
FIG. 9 is a diagram illustrating an example architecture of a functional framework for radio access network (RAN) intelligence enabled by data collection, in accordance with the present disclosure.

FIG. 9 is a diagram illustrating an example architecture 900 of a functional framework for radio access network (RAN) intelligence enabled by data collection, in accordance with the present disclosure. In some scenarios, the functional framework for RAN intelligence may be enabled by further enhancement of data collection through use cases and/or examples. For example, principles or algorithms for RAN intelligence enabled by AI/ML and the associated functional framework (e.g., the AI functionality and/or the input/output of the component for AI enabled optimization) have been utilized or studied to identify the benefits of AI enabled RAN through possible use cases (e.g., beam management, energy saving, load balancing, mobility management, and/or coverage optimization, among other examples). In one example, as shown by the architecture 900, a functional framework for RAN intelligence may include multiple logical entities, such as a model training host 902, a model inference host 904, data sources 906, and an actor 908.

The model inference host 904 may be configured to run an AI/ML model based on inference data provided by the data sources 906, and the model inference host 904 may produce an output (e.g., a prediction) with the inference data input to the actor 908. The actor 908 may be an element or an entity of a core network or a RAN. For example, the actor 908 may be a UE, a network node, base station (e.g., a gNB), a CU, a DU, and/or an RU, among other examples. In addition, the actor 908 may also depend on the type of tasks performed by the model inference host 904, type of inference data provided to the model inference host 904, and/or type of output produced by the model inference host 904. For example, if the output from the model inference host 904 is associated with position determination, the actor 908 may be a UE, a DU or an RU. In some examples, the model inference host 904 may be hosted on the actor 908. For example, a UE may be the actor 908 and may host the model inference host 904. In some aspects, a UE (e.g., the actor 908) may be a data source 906. For example, the UE may perform a measurement (e.g., an NR measurement), may input the measurement to the AI/ML model at the model inference host 904 (or may provide the measurement to the model inference host 904), and may act based on an output of the AI/ML model (e.g., a prediction of one or more traffic parameters associated with uplink data to be compressed).

After the actor 908 receives an output from the model inference host 904, the actor 908 may determine whether to act based on the output. For example, if the actor 908 is a UE and the output from the model inference host 904 is associated with position information, the actor 908 may determine whether to report the position information, reconfigure a beam, among other examples. If the actor 908 determines to act based on the output, in some examples, the actor 908 may indicate the action to at least one subject of action 910. For example, the actor 908 may receive an output including one or more predicted traffic parameters associated with wireless communication traffic (e.g., uplink data for compression including one or more data packets). The actor 908 may classify the wireless communication traffic in accordance with the one or more output traffic parameters or may otherwise receive an output from the model inference host 904 that classifies and/or indicates a classification of the wireless communication traffic.

Based on the classification of the wireless communication traffic, the actor 908 may allocate the wireless communication traffic to a most appropriate compression buffer for compression prior to communication of the wireless communication traffic. For example, the actor 908 may allocate the wireless communication traffic to a compression buffer designated for compressing data messages having the classification of the wireless communication traffic. In some other examples, a most appropriate buffer may be associated with one or more other traffic parameters of the wireless communication traffic.

The data sources 906 may also be configured for collecting data that is used as training data for training an AI/ML model or as inference data for feeding an AI/ML model inference operation. For example, the data sources 906 may collect data from one or more core network and/or RAN entities, which may include the actor 908 or the subject of action 910, and provide the collected data to the model training host 902 for AI/ML model training. For example, such data may be in one or more data categories associated with compressing uplink data. In some aspects, the actor 908 may report, and the model training host 902 may obtain, data associated with the one or more data categories monitored in association with compressing the uplink data. In some aspects, the model training host 902 may train the AI/ML model using the data (e.g., monitored data) and/or may train a corresponding AI/ML model, hosted by another device, using the data.

In some aspects the data categories may include an identifier for each of the one or more compression dictionaries used to compress the uplink data; an identifier of the compression buffer used to compress the data; the one or more traffic parameters of the uplink data; a compression ratio (e.g., a relative reduction in a size of the data); a quantity of compression dictionary resets (e.g., a quantity of occasions in which the UE 120 switched from using one compression dictionary to another); a quantity of compression buffer resets (e.g., a quantity of occasions in which the UE 120 switched from using one compression buffer (e.g., or set of compression buffers) to another); one or more timestamps associated with compressing the uplink data; and/or metadata associated with compressing the uplink data.

In some aspects, the model training host 902 may be co-located with the model inference host 904 and/or the actor 908. For example, the actor 908 or the subject of action 910 may provide performance feedback associated with the beam configuration to the data sources 906, where the performance feedback may be used by the model training host 902 for monitoring or evaluating the ML model performance, such as whether the output (e.g., prediction) provided to the actor 908 is accurate. In some examples, the model training host 902 may monitor or evaluate AI/ML model performance using a training position value, which may be provided by a node (e.g., a UE 120 or a network node 110), as described elsewhere herein. In some examples, if the output provided by the actor 908 is inaccurate (or the accuracy is below an accuracy threshold or the data compression fails to satisfy one or more performance metrics), then the model training host 902 may determine to modify or retrain the ML model used by the model inference host, such as via an ML model deployment/update. In some examples, if the output provided by the actor 908 is inaccurate (or the accuracy is below an accuracy threshold, or the data compression fails to satisfy one or more performance metrics), the actor 908 and/or the model training host 902 may deactivate the AI/ML model or switch AI/ML models. For example, the actor 908 and/or the model training host 902 may deactivate the AI/ML model or switch AI/ML models if the actor 908, in conjunction with the current AI/ML model, does not compress enough PDUs (e.g., fails to meet a threshold quantity of compressed PDUs) and/or the data compression technique, in conjunction with the current AI/ML model, causes too many compression dictionary and/or compression buffer resets.

The model training host 902 may perform AI/ML model training such that the AI/ML model used to predict the one or more traffic parameters for data compression (e.g., as described with reference to FIGS. 6-9) may accurately predict a most appropriate dictionary to use for a particular type of wireless communication traffic and/or traffic mixture in (e.g., associated with, communicated via) a particular radio bearer. Additionally, the model training host 902 may perform AI/ML model training such that the AI/ML model may be used to predict traffic classification associated with different compressors (e.g., compression dictionary and/or buffer combinations).

As indicated above, FIG. 9 is provided as an example. Other examples may differ from what is described with regard to FIG. 9.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with traffic-based data compression.

As shown in FIG. 10, in some aspects, process 1000 may include receiving configuration information associated with uplink data compression, the uplink data compression being associated with at least one of multiple compression dictionaries or multiple compression buffers (block 1010). For example, the UE (e.g., using reception component 1202 and/or communication manager 1206, depicted in FIG. 12) may receive configuration information associated with uplink data compression, the uplink data compression being associated with at least one of multiple compression dictionaries or multiple compression buffers, as described above with respect to reference number 610 of FIG. 6.

As further shown in FIG. 10, in some aspects, process 1000 may include compressing, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data (block 1020). For example, the UE (e.g., using communication manager 1206, depicted in FIG. 12) may compress, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data, as described above with respect to reference number 640 of FIG. 6.

As further shown in FIG. 10, in some aspects, process 1000 may include transmitting an uplink communication that includes the compressed uplink data (block 1030). For example, the UE (e.g., using transmission component 1204 and/or communication manager 1206, depicted in FIG. 12) may transmit an uplink communication that includes the compressed uplink data, as described above with respect to reference number 645 of FIG. 6.

Process 1000 may include additional aspects, such as any single aspect or any combination of aspects described below and/or in connection with one or more other processes described elsewhere herein.

In a first aspect, process 1000 includes predicting the one or more traffic parameters of the uplink data using an AI/ML model.

In a second aspect, alone or in combination with the first aspect, process 1000 includes classifying, prior to compressing the uplink data, the uplink data in accordance with the one or more traffic parameters predicted by the AI/ML model, and allocating the uplink data to the compression buffer of the multiple compression buffers in accordance with classifying the uplink data.

In a third aspect, alone or in combination with one or more of the first and second aspects, process 1000 includes monitoring data associated with a set of data categories in association with compressing the uplink data, reporting the data associated with the set of data categories to a server associated with the AI/ML model, and training the AI/ML model using the data monitored in association with compressing the uplink data.

In a fourth aspect, alone or in combination with one or more of the first through third aspects, the set of data categories comprises at least one of an identifier for each of the one or more compression dictionaries used to compress the uplink data, an identifier of the compression buffer used to compress the data, the one or more traffic parameters of the uplink data, a compression ratio, a quantity of compression dictionary resets, a quantity of compression buffer resets, one or more timestamps associated with compressing the uplink data, or metadata associated with compressing the uplink data.

In a fifth aspect, alone or in combination with one or more of the first through fourth aspects, process 1000 includes identifying that data associated with at least one data category of a set of data categories fails to meet a performance metric, and performing an action in association with identifying that the data fails to meet a performance metric.

In a sixth aspect, alone or in combination with one or more of the first through fifth aspects, performing the action in association with identifying that the data fails to meet a performance metric comprises disabling a first AI/ML model, and enabling a second AI/ML model.

In a seventh aspect, alone or in combination with one or more of the first through sixth aspects, performing the action in association with identifying that the data fails to meet a performance metric comprises selecting at least one of one or more second compression dictionaries or a second compression buffer.

In an eighth aspect, alone or in combination with one or more of the first through seventh aspects, performing the action in association with identifying that the data fails to meet a performance metric comprises resetting, for subsequent uplink data compression, one or more of the one or more compression dictionaries to a default compression dictionary or the compression buffer to a default compression buffer.

In a ninth aspect, alone or in combination with one or more of the first through eighth aspects, performing the action in association with identifying that the data fails to meet a performance metric comprises transmitting a performance failure report.

In a tenth aspect, alone or in combination with one or more of the first through ninth aspects, performing the action in association with identifying that the data fails to meet a performance metric comprises disabling uplink data compression associated with a radio bearer of the data, wherein the first wireless communication device is configured with one or more radio bearers including the radio bearer for communicating with one or more other wireless communication devices.

In an eleventh aspect, alone or in combination with one or more of the first through tenth aspects, the performance metric comprises at least one of a compression ratio performance metric, a compression dictionary reset rate performance metric, a compression buffer reset rate performance metric, or a compression dictionary update performance metric.

In a twelfth aspect, alone or in combination with one or more of the first through eleventh aspects, process 1000 includes obtaining encrypted data for uplink data transmission, predicting one or more traffic parameters of the encrypted data using an AI/ML model, classifying, in accordance with the one or more traffic parameters of the encrypted data predicted by the AI/ML model, the encrypted data as encrypted traffic, and refraining from compressing the encrypted data.

In a thirteenth aspect, alone or in combination with one or more of the first through twelfth aspects, the uplink data includes one or more messages, wherein the compression buffer is associated with a message type, and the method further comprises classifying, in accordance with the one or more traffic parameters, the one or more messages as being associated with the message type, and allocating the one or more messages to the compression buffer in association with classifying the one or more messages as being associated with the message type.

In a fourteenth aspect, alone or in combination with one or more of the first through thirteenth aspects, the message type comprises an uplink transmission control protocol acknowledgement message type.

In a fifteenth aspect, alone or in combination with one or more of the first through fourteenth aspects, process 1000 includes transmitting an indication of the one or more compression dictionaries or the compression buffer selected in association with one or more traffic parameters of the uplink data.

In a sixteenth aspect, alone or in combination with one or more of the first through fifteenth aspects, process 1000 includes transmitting a capability message comprising one or more of an uplink data compression capability, a set of supported compression dictionaries, or a quantity of supported compression dictionaries, wherein the set of supported compression dictionaries comprises the multiple compression dictionaries.

In a seventeenth aspect, alone or in combination with one or more of the first through sixteenth aspects, the capability message comprises one or more tuples indicating the set of supported compression dictionaries.

In an eighteenth aspect, alone or in combination with one or more of the first through seventeenth aspects, the capability message comprises an indication of at least one of whether AI/ML uplink data compression is supported, a quantity of compression buffers supported by the first wireless communication device, a total compression buffer size supported by the first wireless communication device, an individual compression buffer size supported by the first wireless communication device, one or more AI/ML dictionaries supported by the first wireless communication device, whether dynamic compression dictionary updating is supported by the first wireless communication device, or an uplink data rate supported by the first wireless communication device.

In a nineteenth aspect, alone or in combination with one or more of the first through eighteenth aspects, the configuration information indicates at least one of a quantity of enabled compression buffers, an individual compression buffer size for each of the multiple compression buffers, a total compression buffer size for the multiple compression buffers, a set of enabled compression dictionaries comprising the multiple compression dictionaries, whether dynamic compression dictionary updating is enabled, whether AI/ML prediction of the one or more traffic parameters is enabled, one or more QoS flows enabled for uplink data compression, a compression ratio performance metric, a compression dictionary reset rate performance metric, a compression buffer reset rate performance metric, or a compression dictionary update timing performance metric.

In a twentieth aspect, alone or in combination with one or more of the first through nineteenth aspects, process 1000 includes selecting, in accordance with the one or more traffic parameters, one or more compression buffers for compressing the uplink data, wherein a quantity of the one or more compression buffers is based on the quantity of enabled compression buffers indicated by the configuration information and includes the compression buffer.

In a twenty-first aspect, alone or in combination with one or more of the first through twentieth aspects, process 1000 includes selecting the one or more compression dictionaries using a version identifier of the one or more compression dictionaries or a version identifier of each of the one or more compression dictionaries.

In a twenty-second aspect, alone or in combination with one or more of the first through twenty-first aspects, process 1000 includes classifying, prior to compressing the uplink data, the uplink data using an AI/ML model, and allocating the uplink data to the compression buffer of the multiple compression buffers in accordance with classifying the uplink data.

In a twenty-third aspect, alone or in combination with one or more of the first through twenty-second aspects, a header of the compressed uplink data indicates one or more of the compression buffer, the one or more compression dictionaries, or information associated with the one or more compression dictionaries.

In a twenty-fourth aspect, alone or in combination with one or more of the first through twenty-third aspects, process 1000 includes selecting the compression buffer according to a QoS flow indicator-to-buffer mapping associated with a QoS flow of the uplink data, and transmitting control signaling comprising an indication of the QoS flow indicator-to-buffer mapping.

In a twenty-fifth aspect, alone or in combination with one or more of the first through twenty-fourth aspects, the control signaling comprises one or more of radio resource control signaling or packet data convergence protocol control signaling.

In a twenty-sixth aspect, alone or in combination with one or more of the first through twenty-fifth aspects, process 1000 includes selecting the one or more compression dictionaries according to a QoS flow of the uplink data.

In a twenty-seventh aspect, alone or in combination with one or more of the first through twenty-sixth aspects, process 1000 includes receiving an indication of a default compression buffer, wherein the compression buffer comprises the default compression buffer.

In a twenty-eighth aspect, alone or in combination with one or more of the first through twenty-seventh aspects, the uplink communication comprises a packet header that indicates a presence of a compression header for the compressed uplink data.

In a twenty-ninth aspect, alone or in combination with one or more of the first through twenty-eighth aspects, process 1000 includes refraining from compressing second uplink data, and transmitting a second uplink communication that includes the second uplink data in accordance with refraining from compressing the second uplink data, wherein the second uplink communication includes a packet header that indicates an absence of a compression header for the second uplink data.

In a thirtieth aspect, alone or in combination with one or more of the first through twenty-ninth aspects, process 1000 includes transmitting an uplink data compression update comprising an indication of one or more of a second one or more compression dictionaries of the multiple compression dictionaries, a second compression buffer of the multiple compression buffers, an updated compression buffer size of the compression buffer, a compression buffer size of the second compression buffer, or an updated quantity of compression buffers used for compression by the first wireless communication device.

In a thirty-first aspect, alone or in combination with one or more of the first through thirtieth aspects, process 1000 includes receiving an indication accepting or rejecting the uplink data compression update.

In a thirty-second aspect, alone or in combination with one or more of the first through thirty-first aspects, process 1000 includes predicting the one or more traffic parameters of the uplink data using a computational model.

In a thirty-third aspect, alone or in combination with one or more of the first through thirty-second aspects, process 1000 includes classifying, prior to compressing the uplink data, the uplink data in accordance with the one or more traffic parameters predicted by the computational model, and allocating the uplink data to the compression buffer of the multiple compression buffers in accordance with classifying the uplink data.

In a thirty-fourth aspect, alone or in combination with one or more of the first through thirty-third aspects, process 1000 includes monitoring data associated with a set of data categories in association with compressing the uplink data, reporting the data associated with the set of data categories to a server associated with the AI/ML model, and training the AI/ML model using the data monitored in association with compressing the uplink data.

In a thirty-fifth aspect, alone or in combination with one or more of the first through thirty-fourth aspects, process 1000 includes obtaining encrypted data for uplink data transmission, predicting one or more traffic parameters of the encrypted data using a computational model, classifying, in accordance with the one or more traffic parameters of the encrypted data predicted by the computational model, the encrypted data as encrypted traffic, and refraining from compressing the encrypted data.

In a thirty-sixth aspect, alone or in combination with one or more of the first through thirty-fifth aspects, process 1000 includes classifying, prior to compressing the uplink data, the uplink data using a computational model, and allocating the uplink data to the compression buffer of the multiple compression buffers in accordance with classifying the uplink data.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, at a network node or an apparatus of a network node, in accordance with the present disclosure. Example process 1100 is an example where the apparatus or the network node (e.g., network node 110) performs operations associated with traffic-based data compression.

As shown in FIG. 11, in some aspects, process 1100 may include transmitting, to a first wireless communication device, configuration information associated with uplink data compression, the uplink data compression being associated with at least one of multiple compression dictionaries or multiple compression buffers (block 1110). For example, the network node (e.g., using transmission component 1304 and/or communication manager 1306, depicted in FIG. 13) may transmit, to a first wireless communication device, configuration information associated with uplink data compression, the uplink data compression being associated with at least one of multiple compression dictionaries or multiple compression buffers, as described above.

As further shown in FIG. 11, in some aspects, process 1100 may include receiving an uplink communication that includes uplink data that is compressed in accordance with the configuration information via at least one of: one or more compression dictionaries of the multiple compression dictionaries, or a compression buffer of the multiple compression buffers (block 1120). For example, the network node (e.g., using reception component 1302 and/or communication manager 1306, depicted in FIG. 13) may receive an uplink communication that includes uplink data that is compressed in accordance with the configuration information via at least one of: one or more compression dictionaries of the multiple compression dictionaries, or a compression buffer of the multiple compression buffers, as described above.

Process 1100 may include additional aspects, such as any single aspect or any combination of aspects described below and/or in connection with one or more other processes described elsewhere herein.

In a first aspect, process 1100 includes receiving encrypted data that is uncompressed.

In a second aspect, alone or in combination with the first aspect, the uplink data includes one or more messages, wherein the compression buffer is associated with a message type, and wherein the message type comprises an uplink transmission control protocol acknowledgement message type.

In a third aspect, alone or in combination with one or more of the first and second aspects, process 1100 includes receiving an indication of the one or more compression dictionaries or the compression buffer selected in association with one or more traffic parameters of the uplink data.

In a fourth aspect, alone or in combination with one or more of the first through third aspects, process 1100 includes receiving a capability message comprising one or more of an uplink data compression capability, a set of supported compression dictionaries, or a quantity of supported compression dictionaries, wherein the set of supported compression dictionaries comprises the multiple compression dictionaries.

In a fifth aspect, alone or in combination with one or more of the first through fourth aspects, the capability message comprises one or more tuples indicating the set of supported compression dictionaries.

In a sixth aspect, alone or in combination with one or more of the first through fifth aspects, the capability message comprises an indication of at least one of whether AI/ML uplink data compression is supported, a quantity of compression buffers supported by the first wireless communication device, a total compression buffer size supported by the first wireless communication device, an individual compression buffer size supported by the first wireless communication device, one or more AI/ML dictionaries supported by the first wireless communication device, whether dynamic compression dictionary updating is supported by the first wireless communication device, or an uplink data rate supported by the first wireless communication device.

In a seventh aspect, alone or in combination with one or more of the first through sixth aspects, the configuration information indicates at least one of a quantity of enabled compression buffers, an individual compression buffer size for each of the multiple compression buffers, a total compression buffer size for the multiple compression buffers, a set of enabled compression dictionaries comprising the multiple compression dictionaries, whether dynamic compression dictionary updating is enabled, whether AI/ML prediction of the one or more traffic parameters is enabled, one or more QoS flows enabled for uplink data compression, a compression ratio performance metric, a compression dictionary reset rate performance metric, a compression buffer reset rate performance metric, or a compression dictionary update timing performance metric.

In an eighth aspect, alone or in combination with one or more of the first through seventh aspects, a header of the uplink data that is compressed indicates one or more of the compression buffer, the one or more compression dictionaries, or information associated with the one or more compression dictionaries.

In a ninth aspect, alone or in combination with one or more of the first through eighth aspects, process 1100 includes receiving control signaling comprising an indication of a QoS flow indicator-to-buffer mapping, wherein the compression buffer corresponds to a QoS flow of the uplink data according to the QoS flow indicator-to-buffer mapping.

In a tenth aspect, alone or in combination with one or more of the first through ninth aspects, the control signaling comprises one or more of radio resource control signaling or packet data convergence protocol control signaling.

In an eleventh aspect, alone or in combination with one or more of the first through tenth aspects, process 1100 includes transmitting an indication of a default compression buffer, wherein the compression buffer comprises the default compression buffer.

In a twelfth aspect, alone or in combination with one or more of the first through eleventh aspects, the uplink communication comprises a packet header that indicates a presence of a compression header for the uplink data that is compressed.

In a thirteenth aspect, alone or in combination with one or more of the first through twelfth aspects, process 1100 includes receiving a second uplink communication that includes second uplink data that is uncompressed, wherein the second uplink communication includes a packet header that indicates an absence of a compression header for the second uplink data.

In a fourteenth aspect, alone or in combination with one or more of the first through thirteenth aspects, process 1100 includes receiving an uplink data compression update comprising an indication of one or more of a second one or more compression dictionaries of the multiple compression dictionaries, a second compression buffer of the multiple compression buffers, an updated compression buffer size of the compression buffer, a compression buffer size of the second compression buffer, or an updated quantity of compression buffers used for compression by the first wireless communication device.

In a fifteenth aspect, alone or in combination with one or more of the first through fourteenth aspects, process 1100 includes transmitting an indication accepting or rejecting the uplink data compression update.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
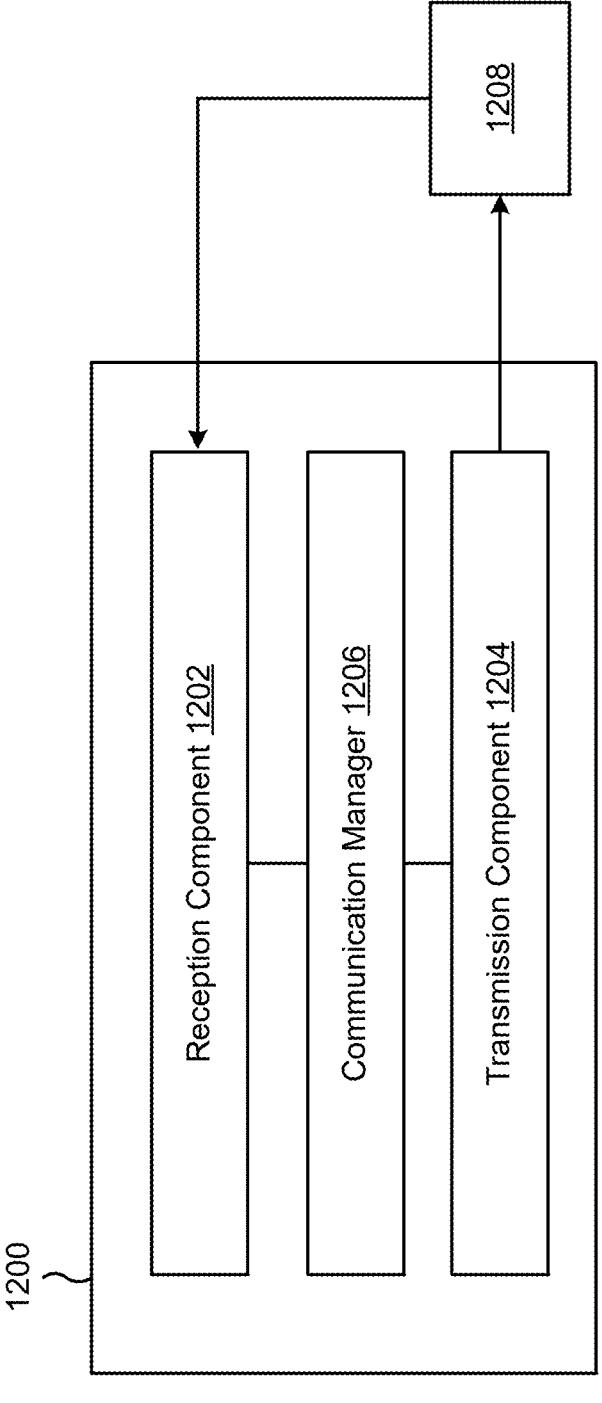
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a first wireless communication device, or a first wireless communication device may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 and/or the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE and/or network node described in connection with FIG. 1 and FIG. 2. Additionally, or alternatively, one or more components shown in FIG. 12 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the first wireless communication device described in connection with FIG. 1 and FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the first wireless communication device described in connection with FIG. 1 and FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive configuration information associated with uplink data compression, the uplink data compression being associated with at least one of multiple compression dictionaries or multiple compression buffers. The communication manager 1206 may compress, in accordance with the configuration information, uplink data to generate compressed uplink data via at least one of one or more compression dictionaries of the multiple compression dictionaries, or a compression buffer of the multiple compression buffers, and the one or more compression dictionaries or the compression buffer being selected in association with one or more traffic parameters of the uplink data. The transmission component 1204 may transmit an uplink communication that includes the compressed uplink data.

The communication manager 1206 may predict the one or more traffic parameters of the uplink data using an AI/ML model. The communication manager 1206 may classify, prior to compressing the uplink data, the uplink data in accordance with the one or more traffic parameters predicted by the AI/ML model. The communication manager 1206 may allocate the uplink data to the compression buffer of the multiple compression buffers in accordance with classifying the uplink data.

The communication manager 1206 may monitor data associated with a set of data categories in association with compressing the uplink data. The communication manager 1206 and/or the transmission component 1204 may report the data associated with the set of data categories to a server associated with the AI/ML model. The communication manager 1206 may train the AI/ML model using the data monitored in association with compressing the uplink data.

The communication manager 1206 may identify that data associated with at least one data category of a set of data categories fails to meet a performance metric. The communication manager 1206 may perform an action in association with identifying that the data fails to meet a performance metric. The reception component 1202 may obtain encrypted data for uplink data transmission. The communication manager 1206 may predict one or more traffic parameters of the encrypted data using an AI/ML model.

The communication manager 1206 may classify, in accordance with the one or more traffic parameters of the encrypted data predicted by the AI/ML model, the encrypted data as encrypted traffic. The communication manager 1206 may refrain from compressing the encrypted data. The transmission component 1204 may transmit an indication of the one or more compression dictionaries or the compression buffer selected in association with one or more traffic parameters of the uplink data. The transmission component 1204 may transmit a capability message comprising one or more of an uplink data compression capability, a set of supported compression dictionaries, or a quantity of supported compression dictionaries, wherein the set of supported compression dictionaries comprises the multiple compression dictionaries.

The communication manager 1206 may predict the one or more traffic parameters of the uplink data using a computational model. The communication manager 1206 may classify, prior to compressing the uplink data, the uplink data in accordance with the one or more traffic parameters predicted by the computational model. The communication manager 1206 may allocate the uplink data to the compression buffer of the multiple compression buffers in accordance with classifying the uplink data.

The communication manager 1206 may monitor data associated with a set of data categories in association with compressing the uplink data. The communication manager 1206 and/or the transmission component 1204 may report the data associated with the set of data categories to a server associated with the computational model. The communication manager 1206 may train the computational model using the data monitored in association with compressing the uplink data. The reception component 1202 may obtain encrypted data for uplink data transmission. The communication manager 1206 may predict one or more traffic parameters of the encrypted data using a computational model. The communication manager 1206 may classify, in accordance with the one or more traffic parameters of the encrypted data predicted by the computational model, the encrypted data as encrypted traffic.

The communication manager 1206 may select, in accordance with the one or more traffic parameters, one or more compression buffers for compressing the uplink data, wherein a quantity of the one or more compression buffers is based on the quantity of enabled compression buffers indicated by the configuration information and includes the compression buffer.

The communication manager 1206 may select the one or more compression dictionaries using a version identifier of the one or more compression dictionaries or a version identifier of each of the one or more compression dictionaries.

The communication manager 1206 may classify, prior to compressing the uplink data, the uplink data using an AI/ML model. The communication manager 1206 may classify, prior to compressing the uplink data, the uplink data using a computational model.

The communication manager 1206 may allocate the uplink data to the compression buffer of the multiple compression buffers in accordance with classifying the uplink data.

The communication manager 1206 may select the compression buffer according to a quality-of-service flow indicator-to-buffer mapping associated with a quality-of-service flow of the uplink data.

The transmission component 1204 may transmit control signaling comprising an indication of the quality-of-service flow indicator-to-buffer mapping.

The communication manager 1206 may select the one or more compression dictionaries according to a quality-of-service flow of the uplink data.

The reception component 1202 may receive an indication of a default compression buffer, wherein the compression buffer comprises the default compression buffer.

The communication manager 1206 may refrain from compressing second uplink data.

The transmission component 1204 may transmit a second uplink communication that includes the second uplink data in accordance with refraining from compressing the second uplink data, wherein the second uplink communication includes a packet header that indicates an absence of a compression header for the second uplink data.

The transmission component 1204 may transmit an uplink data compression update comprising an indication of one or more of a second one or more compression dictionaries of the multiple compression dictionaries, a second compression buffer of the multiple compression buffers, an updated compression buffer size of the compression buffer, a compression buffer size of the second compression buffer, or an updated quantity of compression buffers used for compression by the first wireless communication device.

The reception component 1202 may receive an indication accepting or rejecting the uplink data compression update.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
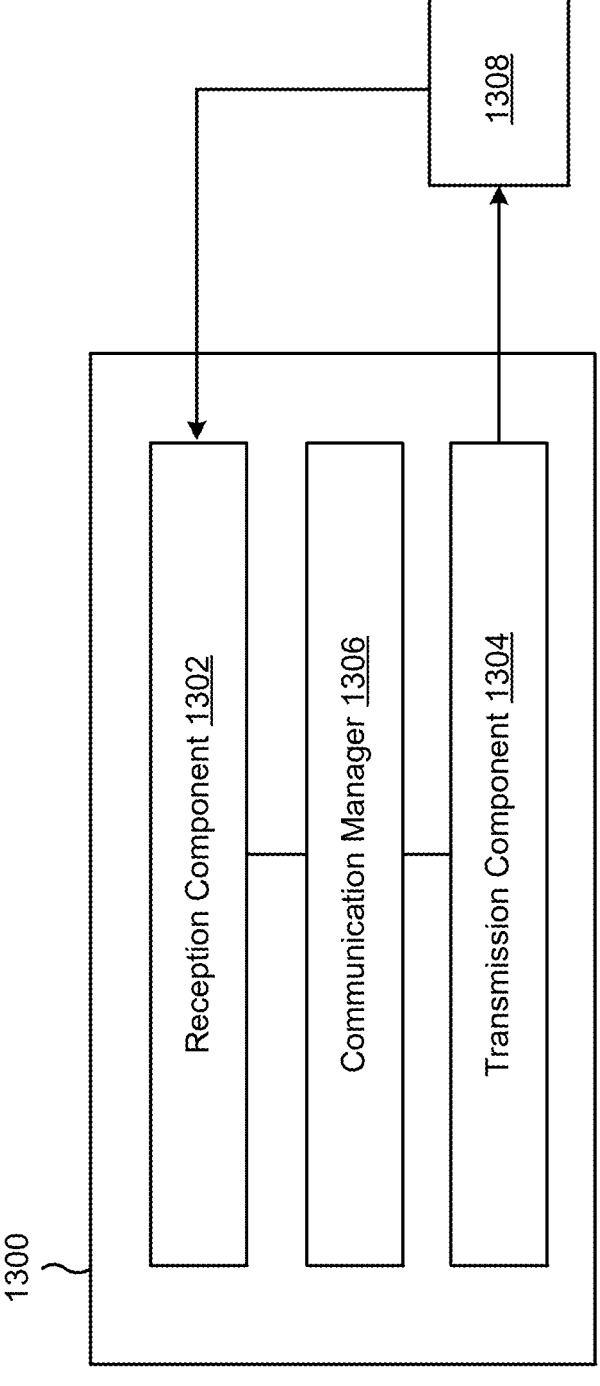
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a second wireless communication device, or a second wireless communication device may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 and/or the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE and/or network node described in connection with FIG. 1 and FIG. 2. Additionally, or alternatively, one or more components shown in FIG. 13 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the second wireless communication device described in connection with FIG. 1 and FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the second wireless communication device described in connection with FIG. 1 and FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may transmit, to a first wireless communication device, configuration information associated with uplink data compression, the uplink data compression being associated with at least one of multiple compression dictionaries or multiple compression buffers. The reception component 1302 may receive an uplink communication that includes uplink data that is compressed in accordance with the configuration information via at least one of one or more compression dictionaries of the multiple compression dictionaries, or a compression buffer of the multiple compression buffers and the one or more compression dictionaries or the compression buffer are associated with one or more traffic parameters of the uplink data.

The reception component 1302 may receive encrypted data that is uncompressed.

The reception component 1302 may receive an indication of the one or more compression dictionaries or the compression buffer selected in association with one or more traffic parameters of the uplink data.

The reception component 1302 may receive a capability message comprising one or more of an uplink data compression capability, a set of supported compression dictionaries, or a quantity of supported compression dictionaries, wherein the set of supported compression dictionaries comprises the multiple compression dictionaries.

The reception component 1302 may receive control signaling comprising an indication of a quality-of-service flow indicator-to-buffer mapping, wherein the compression buffer corresponds to a quality-of-service flow of the uplink data according to the quality-of-service flow indicator-to-buffer mapping.

The transmission component 1304 may transmit an indication of a default compression buffer, wherein the compression buffer comprises the default compression buffer.

The reception component 1302 may receive a second uplink communication that includes second uplink data that is uncompressed, wherein the second uplink communication includes a packet header that indicates an absence of a compression header for the second uplink data.

The reception component 1302 may receive an uplink data compression update comprising an indication of one or more of a second one or more compression dictionaries of the multiple compression dictionaries, a second compression buffer of the multiple compression buffers, an updated compression buffer size of the compression buffer, a compression buffer size of the second compression buffer, or an updated quantity of compression buffers used for compression by the first wireless communication device.

The transmission component 1304 may transmit an indication accepting or rejecting the uplink data compression update.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first wireless communication device, comprising: receiving configuration information associated with uplink data compression, the uplink data compression being associated with at least one of multiple compression dictionaries or multiple compression buffers; compressing, in accordance with the configuration information, uplink data to generate compressed uplink data via at least one of: one or more compression dictionaries of the multiple compression dictionaries, or a compression buffer of the multiple compression buffers, and the one or more compression dictionaries or the compression buffer being selected in association with one or more traffic parameters of the uplink data; and transmitting an uplink communication that includes the compressed uplink data.

Aspect 2: The method of Aspect 1, further comprising: predicting the one or more traffic parameters of the uplink data using an artificial intelligence (AI) or a machine learning (ML) (AI/ML) model.

Aspect 3: The method of Aspect 2, further comprising: classifying, prior to compressing the uplink data, the uplink data in accordance with the one or more traffic parameters predicted by the AI/ML model; and allocating the uplink data to the compression buffer of the multiple compression buffers in accordance with classifying the uplink data.

Aspect 4: The method of any of Aspects 2 and 3, further comprising: monitoring data associated with a set of data categories in association with compressing the uplink data; reporting the data associated with the set of data categories to a server associated with the AI/ML model; and training the AI/ML model using the data monitored in association with compressing the uplink data.

Aspect 5: The method of Aspect 4, wherein the set of data categories comprises at least one of: an identifier for each of the one or more compression dictionaries used to compress the uplink data, an identifier of the compression buffer used to compress the data, the one or more traffic parameters of the uplink data, a compression ratio, a quantity of compression dictionary resets, a quantity of compression buffer resets, one or more timestamps associated with compressing the uplink data, or metadata associated with compressing the uplink data.

Aspect 6: The method of any of Aspects 1-5, further comprising: identifying that data associated with at least one data category of a set of data categories fails to meet a performance metric; and performing an action in association with identifying that the data fails to meet a performance metric.

Aspect 7: The method of Aspect 6, wherein performing the action in association with identifying that the data fails to meet a performance metric comprises: disabling a first artificial intelligence (AI) or a machine learning (ML) (AI/ML) model; and enabling a second AI/ML model.

Aspect 8: The method of any of Aspects 6 and 7, wherein performing the action in association with identifying that the data fails to meet a performance metric comprises: selecting at least one of one or more second compression dictionaries or a second compression buffer.

Aspect 9: The method of any of Aspects 6-8, wherein performing the action in association with identifying that the data fails to meet a performance metric comprises: resetting, for subsequent uplink data compression, one or more of the one or more compression dictionaries to a default compression dictionary or the compression buffer to a default compression buffer.

Aspect 10: The method of any of Aspects 6-9, wherein performing the action in association with identifying that the data fails to meet a performance metric comprises: transmitting a performance failure report.

Aspect 11: The method of any of Aspects 6-10, wherein performing the action in association with identifying that the data fails to meet a performance metric comprises: disabling uplink data compression associated with a radio bearer of the data, wherein the first wireless communication device is configured with one or more radio bearers including the radio bearer for communicating with one or more other wireless communication devices.

Aspect 12: The method of any of Aspects 6-11, wherein the performance metric comprises at least one of: a compression ratio performance metric, a compression dictionary reset rate performance metric, a compression buffer reset rate performance metric, or a compression dictionary update performance metric.

Aspect 13: The method of any of Aspects 1-12, further comprising: obtaining encrypted data for uplink data transmission; predicting one or more traffic parameters of the encrypted data using an artificial intelligence (AI) or a machine learning (ML) (AI/ML) model; classifying, in accordance with the one or more traffic parameters of the encrypted data predicted by the AI/ML model, the encrypted data as encrypted traffic; and refraining from compressing the encrypted data.

Aspect 14: The method of any of Aspects 1-13, wherein the uplink data includes one or more messages, wherein the compression buffer is associated with a message type, and the method further comprises: classifying, in accordance with the one or more traffic parameters, the one or more messages as being associated with the message type; and allocating the one or more messages to the compression buffer in association with classifying the one or more messages as being associated with the message type.

Aspect 15: The method of Aspect 14, wherein the message type comprises an uplink transmission control protocol acknowledgement message type.

Aspect 16: The method of any of Aspects 1-15, further comprising: transmitting an indication of the one or more compression dictionaries or the compression buffer selected in association with one or more traffic parameters of the uplink data.

Aspect 17: The method of any of Aspects 1-16, further comprising: transmitting a capability message comprising one or more of an uplink data compression capability, a set of supported compression dictionaries, or a quantity of supported compression dictionaries, wherein the set of supported compression dictionaries comprises the multiple compression dictionaries.

Aspect 18: The method of Aspect 17, wherein the capability message comprises one or more tuples indicating the set of supported compression dictionaries.

Aspect 19: The method of any of Aspects 17 and 18, wherein the capability message comprises an indication of at least one of: whether artificial intelligence (AI) or machine learning (ML) (AI/ML) uplink data compression is supported, a quantity of compression buffers supported by the first wireless communication device, a total compression buffer size supported by the first wireless communication device, an individual compression buffer size supported by the first wireless communication device, one or more AI/ML dictionaries supported by the first wireless communication device, whether dynamic compression dictionary updating is supported by the first wireless communication device, or an uplink data rate supported by the first wireless communication device.

Aspect 20: The method of any of Aspects 1-19, wherein the configuration information indicates at least one of: a quantity of enabled compression buffers, an individual compression buffer size for each of the multiple compression buffers, a total compression buffer size for the multiple compression buffers, a set of enabled compression dictionaries comprising the multiple compression dictionaries, whether dynamic compression dictionary updating is enabled, whether AI/ML prediction of the one or more traffic parameters is enabled, one or more QoS flows enabled for uplink data compression, a compression ratio performance metric, a compression dictionary reset rate performance metric, a compression buffer reset rate performance metric, or a compression dictionary update timing performance metric.

Aspect 21: The method of Aspect 20, further comprising: selecting, in accordance with the one or more traffic parameters, one or more compression buffers for compressing the uplink data, wherein a quantity of the one or more compression buffers is based on the quantity of enabled compression buffers indicated by the configuration information and includes the compression buffer.

Aspect 22: The method of any of Aspects 1-21, further comprising: selecting the one or more compression dictionaries using a version identifier of the one or more compression dictionaries or a version identifier of each of the one or more compression dictionaries.

Aspect 23: The method of any of Aspects 1-22, further comprising: classifying, prior to compressing the uplink data, the uplink data using an artificial intelligence (AI) or a machine learning (ML) (AI/ML) model; and allocating the uplink data to the compression buffer of the multiple compression buffers in accordance with classifying the uplink data.

Aspect 24: The method of any of Aspects 1-23, wherein a header of the compressed uplink data indicates one or more of the compression buffer, the one or more compression dictionaries, or information associated with the one or more compression dictionaries.

Aspect 25: The method of any of Aspects 1-24, further comprising: selecting the compression buffer according to a quality-of-service flow indicator-to-buffer mapping associated with a quality-of-service flow of the uplink data; and transmitting control signaling comprising an indication of the quality-of-service flow indicator-to-buffer mapping.

Aspect 26: The method of Aspect 25, wherein the control signaling comprises one or more of radio resource control signaling or packet data convergence protocol control signaling.

Aspect 27: The method of any of Aspects 1-26, further comprising: selecting the one or more compression dictionaries according to a quality-of-service flow of the uplink data.

Aspect 28: The method of any of Aspects 1-27, further comprising: receiving an indication of a default compression buffer, wherein the compression buffer comprises the default compression buffer.

Aspect 29: The method of any of Aspects 1-28, wherein the uplink communication comprises a packet header that indicates a presence of a compression header for the compressed uplink data.

Aspect 30: The method of any of Aspects 1-29, further comprising: refraining from compressing second uplink data; and transmitting a second uplink communication that includes the second uplink data in accordance with refraining from compressing the second uplink data, wherein the second uplink communication includes a packet header that indicates an absence of a compression header for the second uplink data.

Aspect 31: The method of any of Aspects 1-30, further comprising: transmitting an uplink data compression update comprising an indication of one or more of a second one or more compression dictionaries of the multiple compression dictionaries, a second compression buffer of the multiple compression buffers, an updated compression buffer size of the compression buffer, a compression buffer size of the second compression buffer, or an updated quantity of compression buffers used for compression by the first wireless communication device.

Aspect 32: The method of Aspect 31, further comprising: receiving an indication accepting or rejecting the uplink data compression update.

Aspect 33: A method of wireless communication performed by a second wireless communication device, comprising: transmitting, to a first wireless communication device, configuration information associated with uplink data compression, the uplink data compression being associated with at least one of multiple compression dictionaries or multiple compression buffers; and receiving an uplink communication that includes uplink data that is compressed in accordance with the configuration information via at least one of: one or more compression dictionaries of the multiple compression dictionaries, or a compression buffer of the multiple compression buffers, and the one or more compression dictionaries or the compression buffer are associated with one or more traffic parameters of the uplink data.

Aspect 34: The method of Aspect 33, further comprising: receiving encrypted data that is uncompressed.

Aspect 35: The method of any of Aspects 33-34, wherein the uplink data includes one or more messages, wherein the compression buffer is associated with a message type, and wherein the message type comprises an uplink transmission control protocol acknowledgement message type.

Aspect 36: The method of any of Aspects 33-35, further comprising: receiving an indication of the one or more compression dictionaries or the compression buffer selected in association with one or more traffic parameters of the uplink data.

Aspect 37: The method of any of Aspects 33-36, further comprising: receiving a capability message comprising one or more of an uplink data compression capability, a set of supported compression dictionaries, or a quantity of supported compression dictionaries, wherein the set of supported compression dictionaries comprises the multiple compression dictionaries.

Aspect 38: The method of Aspect 37, wherein the capability message comprises one or more tuples indicating the set of supported compression dictionaries.

Aspect 39: The method of any of Aspects 37 and 38, wherein the capability message comprises an indication of at least one of: whether artificial intelligence (AI) or machine learning (ML) (AI/ML) uplink data compression is supported, a quantity of compression buffers supported by the first wireless communication device, a total compression buffer size supported by the first wireless communication device, an individual compression buffer size supported by the first wireless communication device, one or more AI/ML dictionaries supported by the first wireless communication device, whether dynamic compression dictionary updating is supported by the first wireless communication device, or an uplink data rate supported by the first wireless communication device.

Aspect 40: The method of any of Aspects 33-39, wherein the configuration information indicates at least one of: a quantity of enabled compression buffers, an individual compression buffer size for each of the multiple compression buffers, a total compression buffer size for the multiple compression buffers, a set of enabled compression dictionaries comprising the multiple compression dictionaries, whether dynamic compression dictionary updating is enabled, whether AI/ML prediction of the one or more traffic parameters is enabled, one or more quality-of-service flows enabled for uplink data compression, a compression ratio performance metric, a compression dictionary reset rate performance metric, a compression buffer reset rate performance metric, or a compression dictionary update timing performance metric.

Aspect 41: The method of any of Aspects 33-40, wherein a header of the uplink data that is compressed indicates one or more of the compression buffer, the one or more compression dictionaries, or information associated with the one or more compression dictionaries.

Aspect 42: The method of any of Aspects 33-41, further comprising: receiving control signaling comprising an indication of a quality-of-service flow indicator-to-buffer mapping, wherein the compression buffer corresponds to a quality-of-service flow of the uplink data according to the quality-of-service flow indicator-to-buffer mapping.

Aspect 43: The method of Aspect 42, wherein the control signaling comprises one or more of radio resource control signaling or packet data convergence protocol control signaling.

Aspect 44: The method of any of Aspects 33-43, further comprising: transmitting an indication of a default compression buffer, wherein the compression buffer comprises the default compression buffer.

Aspect 45: The method of any of Aspects 33-44, wherein the uplink communication comprises a packet header that indicates a presence of a compression header for the uplink data that is compressed.

Aspect 46: The method of any of Aspects 33-45, further comprising: receiving a second uplink communication that includes second uplink data that is uncompressed, wherein the second uplink communication includes a packet header that indicates an absence of a compression header for the second uplink data.

Aspect 47: The method of any of Aspects 33-46, further comprising: receiving an uplink data compression update comprising an indication of one or more of a second one or more compression dictionaries of the multiple compression dictionaries, a second compression buffer of the multiple compression buffers, an updated compression buffer size of the compression buffer, a compression buffer size of the second compression buffer, or an updated quantity of compression buffers used for compression by the first wireless communication device.

Aspect 48: The method of Aspect 47, further comprising: transmitting an indication accepting or rejecting the uplink data compression update.

Aspect 49: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-48.

Aspect 50: An apparatus for wireless communication at a device, the apparatus comprising one or more memories and one or more processors coupled to the one or more memories, the one or more processors configured to cause the device to perform the method of one or more of Aspects 1-48.

Aspect 51: An apparatus for wireless communication, the apparatus comprising at least one means for performing the method of one or more of Aspects 1-48.

Aspect 52: A non-transitory computer-readable medium storing code for wireless communication, the code comprising instructions executable by one or more processors to perform the method of one or more of Aspects 1-48.

Aspect 53: A non-transitory computer-readable medium storing a set of instructions for wireless communication, the set of instructions comprising one or more instructions that, when executed by one or more processors of a device, cause the device to perform the method of one or more of Aspects 1-48.

Aspect 54: A device for wireless communication, the device comprising a processing system that includes one or more processors and one or more memories coupled with the one or more processors, the processing system configured to cause the device to perform the method of one or more of Aspects 1-48.

Aspect 55: An apparatus for wireless communication at a device, the apparatus comprising one or more memories and one or more processors coupled to the one or more memories, the one or more processors individually or collectively configured to cause the device to perform the method of one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a first wireless communication device, comprising:
one or more memories; and
one or more processors, coupled to the one or more memories, configured to cause the first wireless communication device to:
receive configuration information associated with uplink data compression, the uplink data compression being associated with one or more compression dictionaries and one or more compression buffers;
predict one or more traffic parameters of uplink data using an artificial intelligence (AI) or a machine learning (ML) (AI/ML) model;
classify, prior to compressing the uplink data, the uplink data in accordance with the one or more traffic parameters predicted by the AI/ML model;
allocate the uplink data to the one or more compression buffers in accordance with classifying the uplink data;
compress, in accordance with the configuration information, the uplink data to generate compressed uplink data via one or more compression dictionaries and the one or more compression buffers being selected in association with the one or more traffic parameters of the uplink data; and
transmit an uplink communication that includes the compressed uplink data.

2. The apparatus of claim 1, wherein the one or more processors are further configured to cause the first wireless communication device to:
monitor data associated with a set of data categories in association with compressing the uplink data;
report the data associated with the set of data categories to a server associated with the AI/ML model; and
train the AI/ML model using the data monitored in association with compressing the uplink data.

3. The apparatus of claim 1, wherein the one or more processors are further configured to cause the first wireless communication device to:
identify that data associated with at least one data category of a set of data categories fails to meet a performance metric; and
perform an action in association with identifying that the data fails to meet a performance metric.

4. The apparatus of claim 1, wherein the one or more processors are further configured to cause the first wireless communication device to:
obtain encrypted data for uplink data transmission;
predict one or more traffic parameters of the encrypted data using the AI/ML model;
classify, in accordance with the one or more traffic parameters of the encrypted data predicted by the AI/ML model, the encrypted data as encrypted traffic; and
refrain from compressing the encrypted data.

5. The apparatus of claim 1, wherein the uplink data includes one or more messages, wherein the one or more compression buffers are associated with a message type, and the one or more processors are further configured to cause the first wireless communication device to:
classify, in accordance with the one or more traffic parameters, the one or more messages as being associated with the message type; and
allocate the one or more messages to the one or more compression buffers in association with classifying the one or more messages as being associated with the message type.

6. The apparatus of claim 1, wherein the one or more processors are further configured to cause the first wireless communication device to:
transmit an indication of the one or more compression dictionaries or the one or more compression buffers selected in association with one or more traffic parameters of the uplink data.

7. The apparatus of claim 1, wherein the one or more processors are further configured to cause the first wireless communication device to:
transmit a capability message comprising one or more of an uplink data compression capability, a set of supported compression dictionaries, or a quantity of supported compression dictionaries, wherein the set of supported compression dictionaries comprises the one or more compression dictionaries.

8. The apparatus of claim 1, wherein the configuration information indicates at least one of:
a quantity of enabled compression buffers,
an individual compression buffer size for each of the multiple one or more compression buffers, a total compression buffer size for the one or more compression buffers, a set of enabled compression dictionaries comprising the one or more compression dictionaries, whether dynamic compression dictionary updating is enabled, whether AI/ML prediction of the one or more traffic parameters is enabled, one or more quality-of-service flows enabled for uplink data compression, a compression ratio performance metric, a compression dictionary reset rate performance metric, a compression buffer reset rate performance metric, or a compression dictionary update timing performance metric.

9. The apparatus of claim 1, wherein the one or more processors are further configured to cause the first wireless communication device to:

select the one or more compression dictionaries using a version identifier of the one or more compression dictionaries or a version identifier of each of the one or more compression dictionaries.

10. The apparatus of claim 1, wherein the one or more processors are further configured to cause the first wireless communication device to:

classify, prior to compressing the uplink data, the uplink data using the AI/ML model; and allocate the uplink data to the one or more compression buffers in accordance with classifying the uplink data.

11. The apparatus of claim 1, wherein a header of the compressed uplink data indicates the one or more compression buffers, the one or more compression dictionaries, or information associated with the one or more compression dictionaries.

12. The apparatus of claim 1, wherein the one or more processors are further configured to cause the first wireless communication device to:

select the one or more compression buffers according to a quality-of-service flow indicator-to-buffer mapping associated with a quality-of-service flow of the uplink data; and transmit control signaling comprising an indication of the quality-of-service flow indicator-to-buffer mapping.

13. The apparatus of claim 1, wherein the one or more processors are further configured to cause the first wireless communication device to:

refrain from compressing second uplink data; and transmit a second uplink communication that includes the second uplink data in accordance with refraining from compressing the second uplink data, wherein the second uplink communication includes a packet header that indicates an absence of a compression header for the second uplink data.

14. The apparatus of claim 1, wherein the one or more processors are further configured to cause the first wireless communication device to:

transmit an uplink data compression update comprising an indication of one or more of a second one or more compression dictionaries, a second compression buffer of the one or more compression buffers, an updated compression buffer size of the one or more compression buffers, a compression buffer size of the second compression buffer, or an updated quantity of compression buffers used for compression by the first wireless communication device.

15. A method of wireless communication performed by a first wireless communication device, comprising:

receiving configuration information associated with uplink data compression, the uplink data compression being associated with one or more compression dictionaries and one or more compression buffers;

predicting one or more traffic parameters of uplink data using an artificial intelligence (AI) or a machine learning (ML) (AI/ML) model;

classifying, prior to compressing the uplink data, the uplink data in accordance with the one or more traffic parameters predicted by the AI/ML model;

allocating the uplink data to the one or more compression buffers in accordance with classifying the uplink data;

compressing, in accordance with the configuration information, the uplink data to generate compressed uplink data via one or more compression dictionaries and the one or more compression buffers being selected in association with the one or more traffic parameters of the uplink data; and transmitting an uplink communication that includes the compressed uplink data.

16. The method of claim 15, further comprising:

monitoring data associated with a set of data categories in association with compressing the uplink data;

reporting the data associated with the set of data categories to a server associated with the AI/ML model; and training the AI/ML model using the data monitored in association with compressing the uplink data.

17. The method of claim 15, further comprising:

identifying that data associated with at least one data category of a set of data categories fails to meet a performance metric; and performing an action in association with identifying that the data fails to meet a performance metric.

18. The method of claim 15, wherein the uplink data includes one or more messages, wherein the one or more compression buffers are associated with a message type, and further comprising:

classifying, in accordance with the one or more traffic parameters, the one or more messages as being associated with the message type; and allocating the one or more messages to the one or more compression buffers in association with classifying the one or more messages as being associated with the message type.

19. The method of claim 15, further comprising:

transmitting an indication of the one or more compression dictionaries or the one or more compression buffers selected in association with one or more traffic parameters of the uplink data.

20. A non-transitory computer-readable medium storing a set of instructions for wireless communication, the set of instructions comprising:

one or more instructions that, when executed by one or more processors of a first wireless communication device, cause the first wireless communication device to:

receive configuration information associated with uplink data compression, the uplink data compression being associated with one or more compression dictionaries and one or more compression buffers;

predict one or more traffic parameters of uplink data using an artificial intelligence (AI) or a machine learning (ML) (AI/ML) model;

classify, prior to compressing the uplink data, the uplink data in accordance with the one or more traffic parameters predicted by the AI/ML model;

allocate the uplink data to the one or more compression buffers in accordance with classifying the uplink data;

compress, in accordance with the configuration information, the uplink data to generate compressed uplink data via one or more compression dictionaries and the one or more compression buffers being selected in association with the one or more traffic parameters of the uplink data; and transmit an uplink communication that includes the compressed uplink data.

\* \* \* \* \*